(12) United States Patent
Sakuma et al.

(10) Patent No.: US 8,307,157 B2
(45) Date of Patent: Nov. 6, 2012

(54) DISK ARRAY SYSTEM AND TRAFFIC CONTROL METHOD

(75) Inventors: Yuki Sakuma, Odawara (JP); Toshihiro Nitta, Hiratsuka (JP); Midori Kurokawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 270 days.

(21) Appl. No.: 12/741,438

(22) PCT Filed: Apr. 21, 2010

(86) PCT No.: PCT/JP2010/002890
§ 371 (c)(1),
(2), (4) Date: May 5, 2010

(87) PCT Pub. No.: WO2011/132224
PCT Pub. Date: Oct. 27, 2011

(65) Prior Publication Data
US 2012/0047325 A1    Feb. 23, 2012

(51) Int. Cl.
*G06F 12/00* (2006.01)
*G06F 13/00* (2006.01)
*G06F 13/28* (2006.01)
*G06F 11/00* (2006.01)

(52) U.S. Cl. ............. 711/114; 711/170; 714/31; 714/43

(58) Field of Classification Search ................... 711/114, 711/170; 714/31, 43
See application file for complete search history.

(56) References Cited

U.S. PATENT DOCUMENTS

| | | | |
|---|---|---|---|
| 2007/0220204 A1* | 9/2007 | Nakajima et al. | 711/114 |
| 2008/0010530 A1 | 1/2008 | Davies | |
| 2008/0244139 A1* | 10/2008 | Nakajima | 710/300 |
| 2011/0320706 A1* | 12/2011 | Nakajima | 711/114 |

FOREIGN PATENT DOCUMENTS

| | | |
|---|---|---|
| EP | 2163994 A1 | 3/2010 |
| JP | 2008-250631 | 10/2008 |
| WO | 2008045457 A2 | 4/2008 |

* cited by examiner

*Primary Examiner* — Jared Rutz
*Assistant Examiner* — Ryan Bertram
(74) *Attorney, Agent, or Firm* — Brundidge & Stanger, P.C.

(57) ABSTRACT

Proposed are a disk array system and a traffic control method with which reliability can be improved by preventing system shutdown. A disk array system comprises a controller for controlling data I/O to and from a backend unit; a plurality of expanders provided in the backend unit and connected to the controller by way of a tree-structure topology; a plurality of storage devices provided in the backend unit and each connected to the corresponding expander; and a control unit for controlling the controller on the basis of an I/O request from a host device. The disk array system is configured such that the controller notifies the control unit of a link fault that has occurred in the backend unit, and the control unit, when supplied with the link fault notification from the controller, restricts issuance of I/O requests from the host device or restricts receipt of I/O requests sent from the host device as necessary.

12 Claims, 22 Drawing Sheets

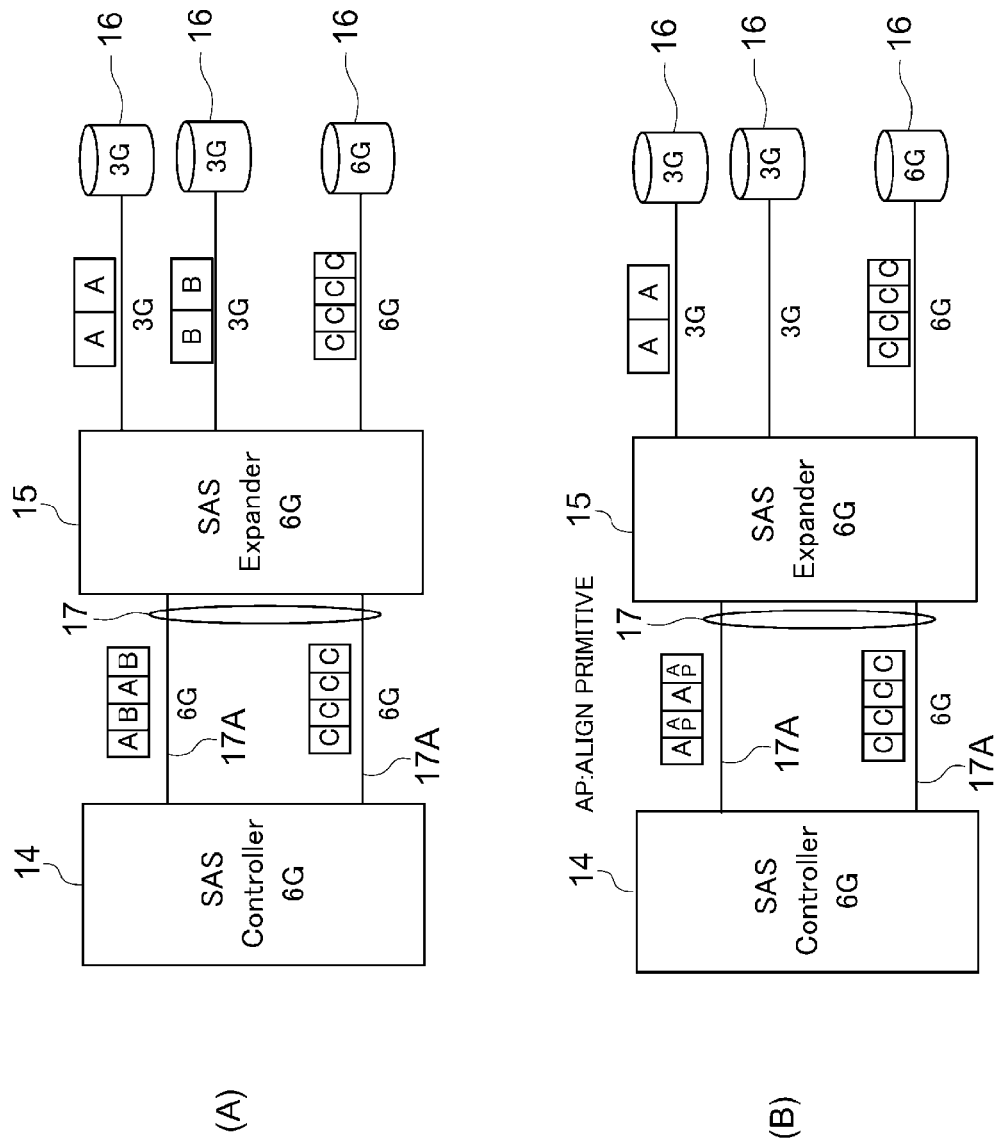

FIG.5
SWITCHING SCHEDULE (FIRST WEEK)
DAY/TIME
(A-1)
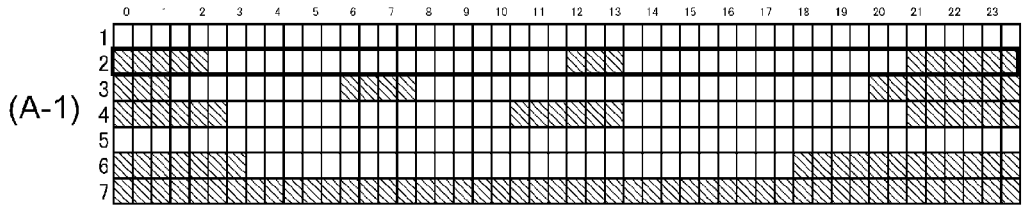
RECORD OF ACCESS RATIO CHANGES (FIRST WEEK)
DAY/TIME
(A-2)
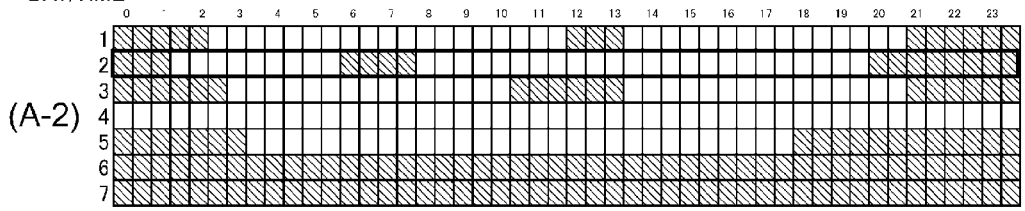
LINK SWITCHING ACTUALLY EXECUTED (FIRST WEEK)
DAY/TIME
(A-3)
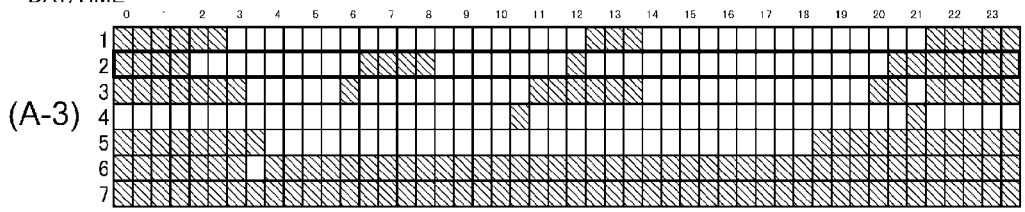
SWITCHING SCHEDULE (SECOND WEEK)
DAY/TIME
(B-1)
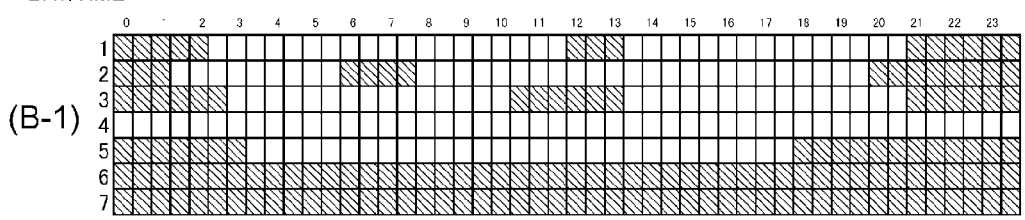
RECORD OF ACCESS RATIO CHANGES (SECOND WEEK)
DAY/TIME
(B-2)
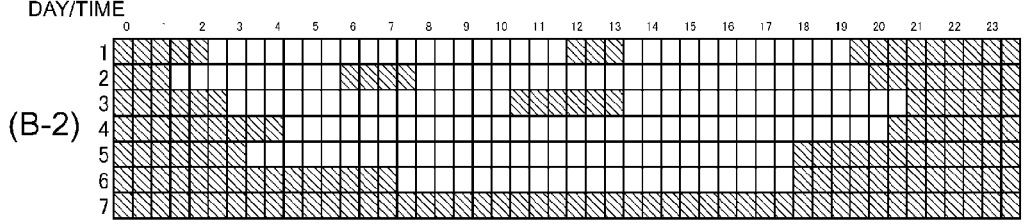
LINK SWITCHING ACTUALLY EXECUTED (THIRD WEEK)
DAY/TIME
(B-3)
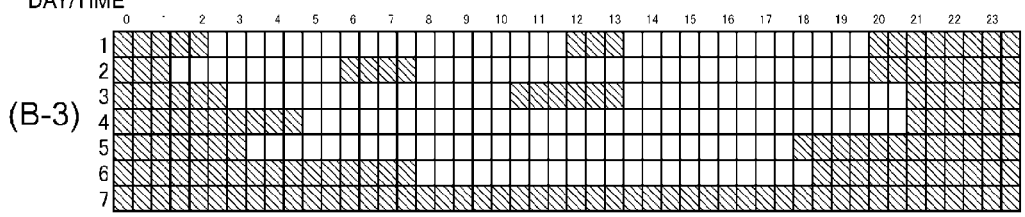

FIG.7

[SAS CTL INFORMATION]

TOTAL NUMBER OF
Exp CONNECTED

NUMBER OF ● G Exp

:

TOTAL NUMBER OF
HDD CONNECTED

NUMBER OF ● G HDD

NUMBER OF ● G HDD

[Expander INFORMATION]
Exp #0
 NUMBER OF Exp CONNECTED
  REPORT GENERAL INFORMATION
   PHY#0 CONNECTED DEVICE INFORMATION
    ·DEVICE TYPE
    ·MAXIMUM PHYSICAL LINK RATE
    ·DESTINATION SAS ADDRESS
PHY #1
 :
 :
PHY #m
____

Exp #1
 :
 :
Exp #n

```
[LINK STATUS INFORMATION]
SAS
PHY#0 active/down
PHY#1 active/down
PHY#2 active/down
PHY#3 active/down Exp#0
 PHY#0 active/down
 PHY#1 active/down
 PHY#2 active/down
 PHY#3 active/down Exp#1
  :
  :
Exp#n
```

[LINK ALLOCATION INFORMATION]
SAS
PHY#0 6G
PHY#1 6G
PHY#2 6G
PHY#3 3G

Exp#0
 PHY#0 6G
 PHY#1 6G
 PHY#2 6G
 PHY#3 3G

Exp#1
:
:
Exp#n

```
[MULTIPLEXED TRANSFER INFORMATION]
SAS
PHY#0 6G enable/disable
PHY#1 6G enable/disable
PHY#2 6G enable/disable
PHY#3 3G enable/disable Exp#0
 PHY#0 6G
enable/disable
 PHY#1 6G
enable/disable
 PHY#2 6G
enable/disable
 PHY#3 3G
enable/disable Exp#1
  :
  :
Exp#n
```

[PERFORMANCE THRESHOLD VALUE INFORMATION]

| LIMIT PERFORMANCE | USER REQUIRED PERFORMANCE | MEASUREMENTS |
|---|---|---|
| SYSTEM PERFORMANCE<br>MB/s IOPS | SYSTEM PERFORMANCE<br>MB/s IOPS | SYSTEM PERFORMANCE<br>MB/s IOPS |
| PATH PERFORMANCE<br>  path#0 MB/s IOPS<br>  path#1 MB/s IOPS | PATH PERFORMANCE<br>  path#0 MB/s IOPS<br>  path#1 MB/s IOPS | PATH PERFORMANCE<br>  path#1 MB/s IOPS |
| PORT PERFORMANCE<br>  port#0 MB/s IOPS<br>  port#1 MB/s IOPS<br>  : | PORT PERFORMANCE<br>  port#0 MB/s IOPS<br>  port#1 MB/s IOPS<br>  : | PORT PERFORMANCE<br>  port#1 MB/s IOPS<br>  : |
| ACCESS RATIO<br>---- | ACCESS RATIO<br>---- | ACCESS RATIO<br><br>---- |

```
[MONITORING PERFORMANCE INFORMATION]
MEASUREMENT 1
SYSTEM PERFORMANCE MB/s IOPS

PATH PERFORMANCE
  path#0 MB/s IOPS
  path#1 MB/s IOPS

PORT PERFORMANCE
  port#0 MB/s IOPS
  port#1 MB/s IOPS
  :

ACCESS RATIO
---
MEASUREMENT 2
SYSTEM PERFORMANCE MB/s IOPS

PATH PERFORMANCE
  path#0 MB/s IOPS
  path#1 MB/s IOPS

PORT PERFORMANCE
  port#0 MB/s IOPS
  port#1 MB/s IOPS
  :

ACCESS RATIO
---
  :
  :
```

[LINK ALLOCATION SWITCHING SCHEDULE INFORMATION]
USER SCHEDULE

SWITCHING SCHEDULE (AUTOMATIC)

ACCESS RATIO INFORMATION

28

DISK ARRAY SYSTEM AND TRAFFIC CONTROL METHOD

TECHNICAL FIELD

The present invention relates to a disk array system (apparatus) and a traffic control method, for instance a method that is suitably applied to a disk array system adopting wide link technology.

BACKGROUND ART

A conventional example of a data transfer control technology based on the SAS (Serial Attached SCSI) standard is a technology known as "wide link" in which a plurality of physical links connected in parallel between devices are bundled as a single logical link (referred to hereinbelow as a "logical link") (see PTL1, for example). A wide link can be formed automatically between an SAS initiator and an SAS expander and between SAS expanders without an instruction being supplied from an SAS initiator.

Furthermore, another SAS-standard data transfer technology is a technology with which a plurality of virtual physical links (also called "logical links" hereinbelow) are formed by subjecting a single physical link to time division (see PTL 1, for example).

These logical links can be set for individual physical links that form a wide link Hence, if a single wide link is formed from two physical links with a maximum data transfer speed (called the "link rate" hereinbelow) of 6 Gbps, four logical links each having a link rate of 3 Gbps can be set in the wide link by setting two logical links with a link rate of 3 Gbps on each individual physical link.

In this case, the SAS initiator is able to establish a connection with a different SAS target via each logical link. Hence, in the above example, the SAS initiator is capable of simultaneously sending and receiving data to and from four SAS targets at the same time.

CITATION LIST

Patent Literature
PTL 1: Japanese Unexamined Patent Publication No. 2008-250631

SUMMARY OF INVENTION

Technical Problem
Further, conventionally speaking, in a disk array system to which this wide link technology is applied, a report of a link fault (a fault rendering communication impossible, for example) at a time other than device rise time is not a target for recovery. Hence, unless path diagnosis processing, as triggered by a recovery target fault, is executed, operation is continuous until all the physical links forming the wide link are 'down'.

However, even when the operation is continued with a single physical link due to a link fault, for example, inputs/outputs (I/O) from a host device are received in the same way as if all the physical links forming the wide link were operating ("active"), and therefore a command time-out occurs frequently in the event of a high load, causing SAS control closure and system shutdown.

In addition, even if one physical link among the physical links forming the wide link goes down, the whole wide link is then closed when a fault is detected during path diagnostic processing. Hence, in the case of a disk array system with a redundant configuration in which SAS controllers and SAS expanders are provided in two systems, there is a risk of system shutdown when the controller in the other system is subjected to a high load.

The present invention was devised in view of the aforementioned problems, and seeks to propose a disk array system and traffic control method with which reliability can be improved by preventing system shutdown.
Solution to Problem In order to achieve the foregoing object, the present invention is a disk array system, comprising a controller for controlling data I/O to and from a backend unit; a plurality of expanders provided in the backend unit and connected to the controller by way of a tree-structure topology; a plurality of storage devices provided in the backend unit and each connected to the corresponding expander; and a control unit for controlling the controller on the basis of an I/O request from a host device. The disk array system is configured such that the controller notifies the control unit of a link fault that has occurred in the backend unit, and the control unit, when supplied with the link fault notification from the controller, restricts issuance of I/O requests from the host device or restricts receipt of I/O requests sent from the host device as necessary.

Furthermore, the present invention is a traffic control method of a disk array system, the disk array system comprising a controller for controlling data I/O to and from a backend unit; a plurality of expanders provided in the backend unit and connected to the controller by way of a tree-structure topology; a plurality of storage devices provided in the backend unit and each connected to the corresponding expander; and a control unit for controlling the controller on the basis of an I/O request from a host device. The traffic control method comprises a first step in which the controller notifies the control unit of a link fault that has occurred in the backend unit, and a second step in which the control unit, when supplied with the link fault notification from the controller, restricts issuance of I/O requests from the host device or restricts receipt of I/O requests sent from the host device as necessary.
Advantageous Effects of Invention According to the present invention, when a link fault occurs in the backend unit, I/O requests from the host device to be processed can be restricted in the backend unit. Hence, command timeout is a frequent occurrence and controller closure as well as system shutdown can be naturally and effectively prevented from occurring. Accordingly, a disk array system and a traffic control method that allow reliability to be improved can be realized.

BRIEF DESCRIPTION OF DRAWINGS

FIG. 4 A and B are conceptual views serving to explain the multiplexed transfer function.

FIG. 5 A-1 to B-3 are conceptual views serving to explain a link allocation switching function.

FIG. 7 Conceptual view serving to explain an SAS controller.

FIG. 8 Conceptual view serving to explain expander information.

FIG. 9 Conceptual view serving to explain link status information.

FIG. 10 Conceptual view serving to explain link allocation information.

FIG. 11 Conceptual view serving to explain multiplexed transfer information.

FIG. 12 Conceptual view serving to explain performance threshold value information.

FIG. 13 Conceptual view serving to explain monitoring performance information.

FIG. 14 Conceptual view serving to explain link allocation switching schedule information.

DESCRIPTION OF PREFERRED EMBODIMENTS

An embodiment of the present invention will be described in detail hereinbelow with reference to the drawings.

(1) Configuration of a Computer System According to this Embodiment.

Figure 1:
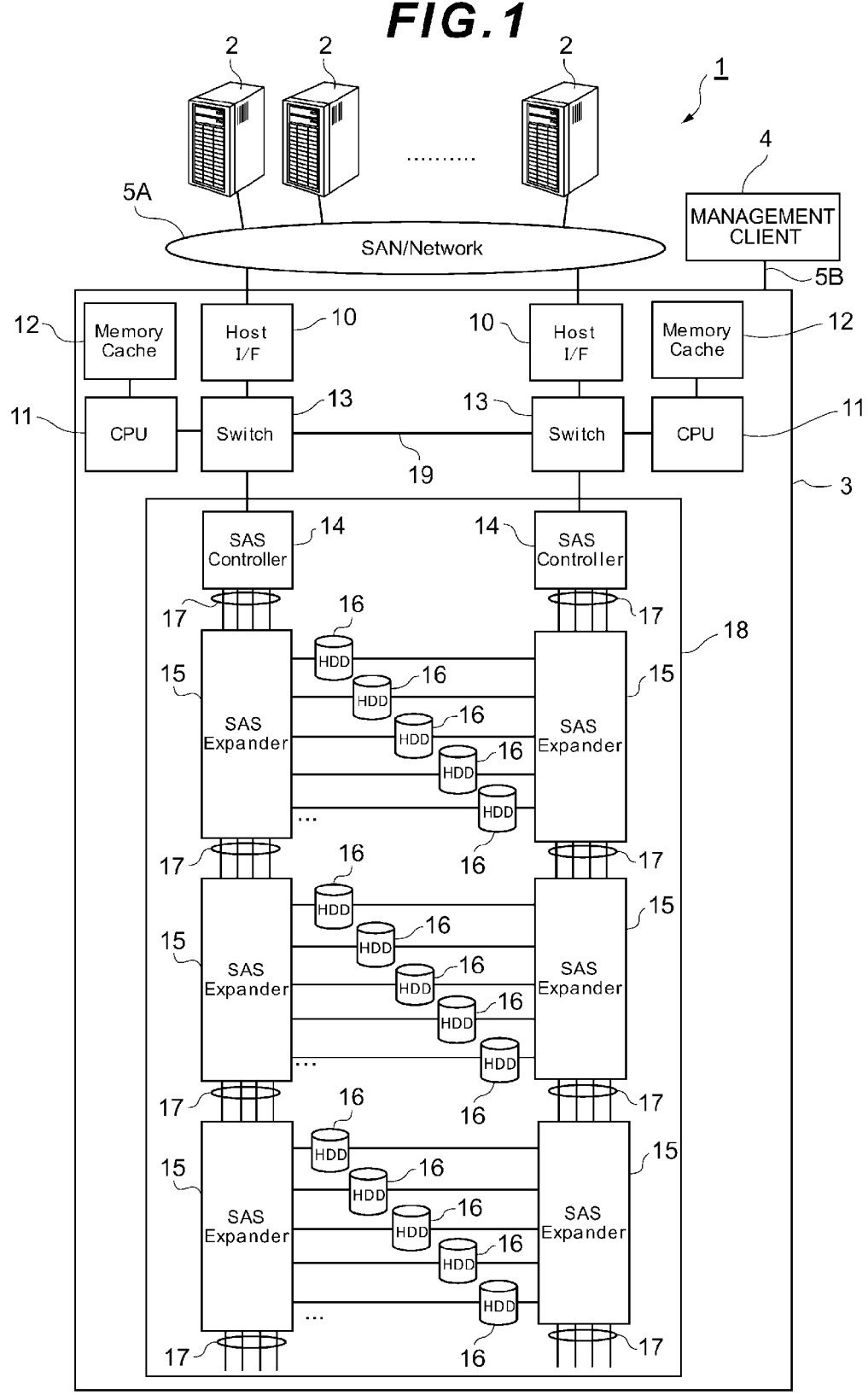
FIG. 1 A block diagram of the whole configuration of a computer system according to this embodiment.

In FIG. 1, 1 represents the overall computer system of this embodiment. This computer system 1 is configured from a plurality of host devices 2, a disk array system 3 and a management client 4.

The host device 2 is a computer device that comprises information processing resources such as a CPU (Central Processing Unit), memory, and the like, and is configured from a personal computer, a workstation, or a mainframe, or the like, for example. The host device 2 comprises information input devices (not shown) such as a keyboard, a switch, a pointing device and/or a microphone, for example, and information output devices (not shown) such as a monitor display and/or speakers, for example, and is connected to a disk array system 3 via a SAN (Storage Area Network) 5A.

The disk array system 3 is configured comprising a host interface 10, a CPU 11, a memory 12, a switch 13, various redundant components such as an SAS controller 14, and SAS expanders 15 and the like, and a plurality of hard disk drives (hard disk devices) 16.

The host interface 10 functions as a communication interface when communicating with the host devices 2 and executes format conversion processing of data and commands that are sent to and received from the host devices 2 via the SAN 5A.

The CPU 11 is a processor that controls data I/O (write access or read access) to and from the hard disk drives 16 in response to data I/O requests from the host devices 2, and which controls the host interface 10, the switch 13, and the SAS controller 14 and so forth by executing a microprogram (described subsequently) stored in the memory 12.

In addition to being used to hold the microprogram and control information and the like, the memory 12 is used to temporarily hold data that is transferred between the host interface 10 and the SAS controller 14.

The switch 13 controls data transfers between the host interface 10 and the SAS controller 14 on the basis of control by the CPU 11. The switch 13 is communicably connected to another redundant switch 13 via a bus 19 to allow the two redundant CPUs 11 to exchange commands and data and the like with one another via the switch 13 and the bus 19.

The SAS controller 14 each contain one or more SSP initiators for controlling SCSI (Small Computer System Interface) commands and one or more SMP (Serial Management Protocol) initiators for controlling commands to instruct the SAS expanders 15.

The ports of the SAS controller 14 are each assigned an SAS address. The SAS address is a port identifier for designating a transmission source port (Source Port) and for designating a transmission destination port (Destination Port) when the initiator port of each protocol of the SAS controller 14 transfers frames to the target port. A WWN (World Wide Name) is normally used as the SAS address.

The SAS controller 14 is connected to a plurality of SAS expanders 15. The SAS expander 15 is a device expansion switch for connecting a plurality of hard disk drives 16 to one SAS controller 14. The SAS expander 15 is designed so that SAS expanders 15 can be connected to one another to achieve expansion with a tree structure topology, thus enabling one SAS controller 14 to control a multiplicity of hard disk drives 16 via a plurality of SAS expanders 15.

In the case of this embodiment, the design is such that the uppermost SAS expanders 15, which are directly connected to the SAS controllers 14, and the SAS expanders 15 are in both cases connected via a wide link 17, and thus the SAS controllers 14 are able to access the plurality of hard disk drives 16 simultaneously via the wide link 17.

The hard disk drives 16 are configured from SAS hard disk drives. The hard disk drives 16 comprise two SSP target ports and these two SSP target ports are each connected to different SAS expanders 15 of the two redundant SAS expanders 15 as mentioned earlier. Separate SAS addresses are assigned to these two SSP target ports. The hard disk drives 16 are controlled by the SAS controller 14 by way of SCSI commands.

Note that a plurality of types of SAS hard disk drives with different link rates (link rates of 1.5 Gbps, 3 Gbps, 6 Gbps, and 12 Gbps . . . ) exist, and that the hard disk drives 16 that are applied to the disk array systems 3 need not necessarily have the same link rate, that is, a plurality of types of SAS hard disk drives with different link rates may also be mixed together.

The management client 4 is configured from a computer such as a personal computer, workstation, or portable information terminal or the like, for example, and is connected to the disk array system 3 via a LAN 5B. The management client 4 comprises a display device that displays a GUI (Graphical User Interface) and various information for making various settings with respect to the disk array system 3, input devices such as a keyboard and a mouse and so forth allowing the operator to perform various operations and input various settings, and a communication device for communicating with the virtualization device 3 via the LAN 5B. The creation and setting of a user schedule, the setting of a multiplexed transfer mode, the setting of a link allocation switching interval and a link allocation switching automatic mode and so on, as will be described subsequently, are performed using the management client 14.

(2) Various Functions Installed in the Disk Array System

Various traffic control functions installed in the disk array system 3 will be described next.

In the case of this embodiment, a first feature of the disk array system 3 is a built-in I/O restriction function that restricts I/O requests from the host devices 2 where necessary if a link fault occurs in the backend unit 18, which is configured from the SAS controller 14, the SAS expander 15, the hard disk drive 16, and the links formed therebetween.

In reality, the disk array system 3 acquires current performance-related information of the backend unit 18 such as the overall IOPS (I/O amount of data per second) of the backend unit 18 and the IOPS of each path and port in the backend unit 18 in cases where a link fault occurs in the backend unit 18 or the number of devices (SAS expanders 15 and hard disk drives 16) changes.

Furthermore, the disk array system 3 performs predetermined I/O restrictions such as reducing the number of commands received (accepted) from the host devices 2, for example, to a smaller number than normal if the current performance of the backend unit 18 falls below the pre-registered performance required by the user.

In addition, a second feature of the disk array systems 3 is a built-in link allocation function that, if the backend unit 18 contains a mixture of hard disk drives 16 of a plurality of types with different link rates, proportionally distributes a plurality of physical links 17A that form part of the wide links 17 connecting the SAS controllers 14 and the uppermost SAS expanders 15, and connecting the SAS expanders 15, for each link rate on the basis of a total number of hard disk drives 16 per link rate connected to the wide links 17, a proportion of the total number of accesses to the hard disk drives 16 of each link rate, and the link rate.

In reality, in the disk array system 3, if there is a mixture of hard disk drives 16 of a plurality of types with different link rates in the backend unit 18, the ratio of numerical values L that are calculated for each link rate by the following equation is calculated for the wide link 17 concerned.

[Math.1]

$$L = N \times LR \times AR \tag{1}$$

Here, in Equation (1), N denotes the number of hard disk drives 16 with that link rate that follow the wide link 17 concerned, and LR denotes the link rate. Furthermore, AR denotes the value of an item that corresponds to the link rate when the total number of accesses to the hard disk drives 16 of each link rate that follow the wide link 17 concerned is denoted by a ratio.

Further, the disk array system 3 determines in each case the number of physical links to be allocated to each link rate so that the physical links 17A forming part of the wide links 17 are proportionally distributed on the basis of the ratio of the numerical values L for each link rate.

In addition, the disk array system 3 allocates physical links 17A in a number that is determined for each link rate (as described earlier) to each link rate from among the physical links 17A that form part of the wide link 17 concerned, and subsequently access to the hard disk drives 16 corresponding to these link rates is performed only via the physical link allocated to that link rate.

For example, as shown in FIG. 2B, in an environment where three 6-Gbps hard disk drives 16 and two 3-Gbps hard disk drives 16 are connected to a first SAS expander 15, which is directly connected to the SAS controller 14, and a second SAS expander 15 that is connected to the first SAS expander 15, the ratio between the total number of accesses to the 6-Gbps hard disk drives 16 and the total number of accesses to the 3-Gbps hard disk drives is 1:1, as shown in FIG. 2A.

In this case, the disk array system 3 uses the following equation to calculate, for the wide link 17 connecting the SAS controller 14 to the first SAS expander 15, the ratio of the number of physical links that are to be allocated to each of the 6 Gbps and 3 Gbps link rates.

[Math.2]

$$(6 \text{ Gbps} \times 6 \text{ devices} \times 1):(3 \text{ Gbps} \times 4 \text{ devices} \times 1) \tag{2}$$

In this example, since Equation (2) is 3:1, the disk array system 3 uses the ratio 3:1 to proportionally distribute the four physical links 17A that form part of the wide link 17 between the SAS controller 14 and the first SAS expander 15, allocating three physical links 17A to the 6-Gbps link rate and one physical link 17A to the 3-Gbps link rate. Furthermore, the disk array system 3 subsequently accesses the 6-Gbps hard disk drives 16 only via the physical links 17A allocated to the 6-Gbps hard disk drives 16, and accesses the 3-Gbps hard disk drives 16 only via the physical link 17A allocated to the 3-Gbps hard disk drive 16.

Furthermore, as shown in FIG. 2C, if the ratio between the total number of accesses to the 6-Gbps hard disk drives 16 connected to the second SAS expander 15 and the total number of accesses to the 3-Gbps hard disk drive 16 is 1:1, the disk array system 3 uses the following equation to calculate, for the wide link 17 connecting the first expander 15 and the second SAS expander 15, the ratio of the number of physical links to be allocated to the respective 6-Gbps and 3-Gbps link rates.

[Math.3]

$$(6 \text{ Gbps} \times 3 \text{ devices} \times 1):(3 \text{ Gbps} \times 2 \text{ devices} \times 1) \tag{3}$$

In this example, since equation (3) is 3:1, the disk array system 3 uses the ratio 3:1 to proportionally distribute the four physical links 17A that form part of the wide link 17 between the first and second SAS expanders 15, allocating three physical links 17A to the 6-Gbps link rate and one physical link 17A to the 3-Gbps link rate. The disk array system 3 then accesses the 6-Gbps hard disk drives 16 only via the physical links 17A allocated to the 6-Gbps hard disk drives 16, and accesses the 3-Gbps hard disk drives 16 only via the physical link 17A allocated to the 3-Gbps hard disk drive 16.

Figure 2:
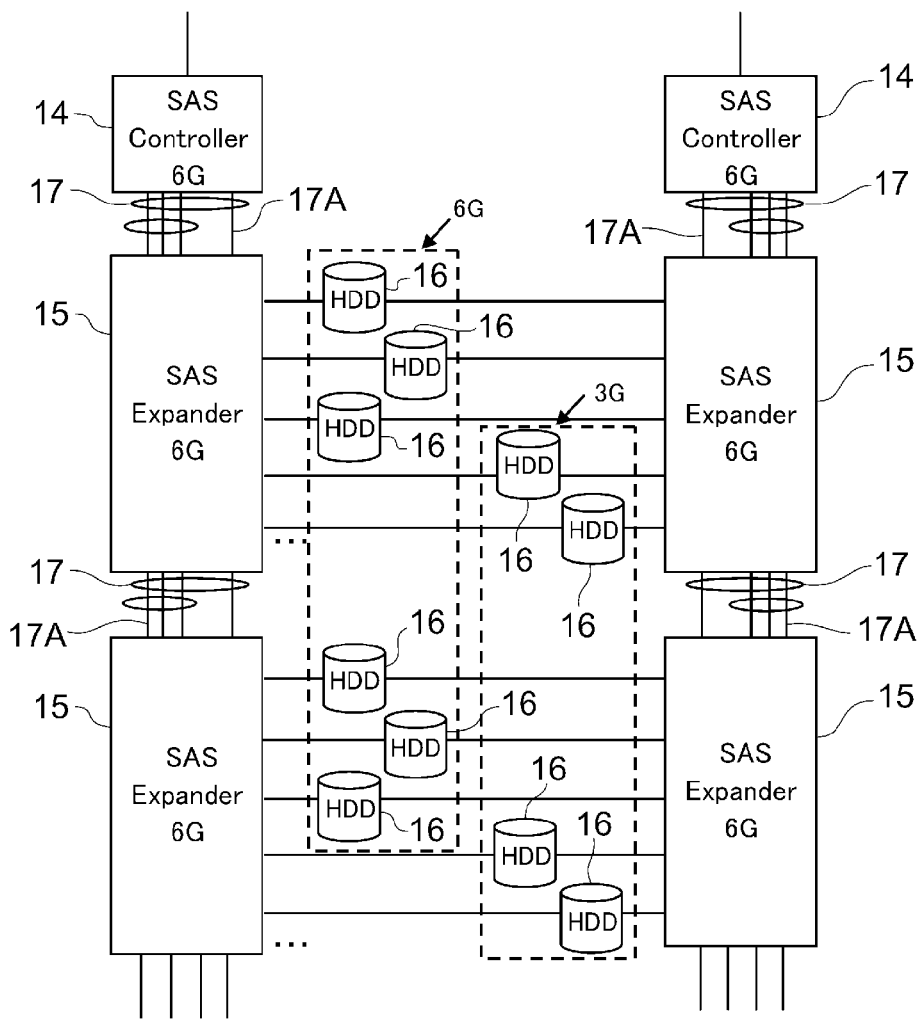
FIG. 2 A to C are tables and a block diagram serving to explain a link allocation function.
Figure 3A:
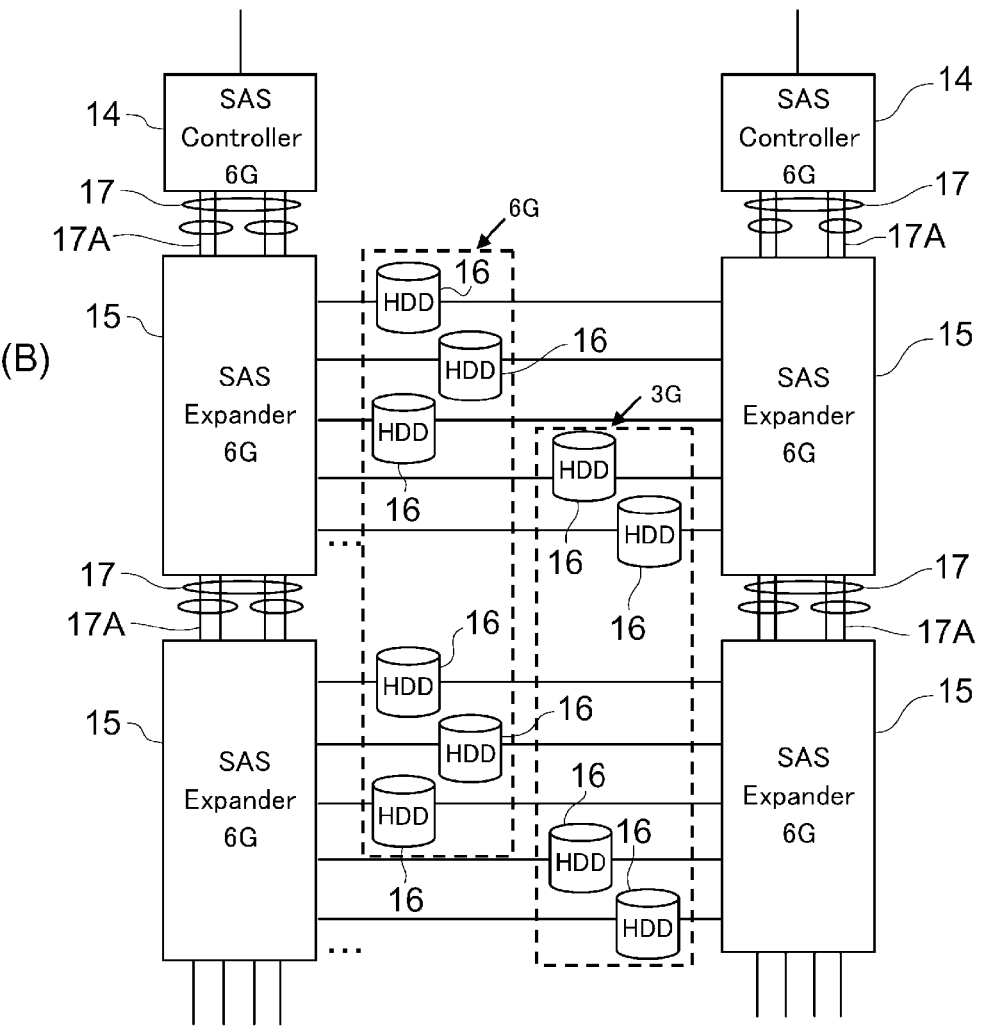
FIG. 3A A to C are tables and a block diagram serving to explain a link allocation function.

Furthermore, in the environment shown in FIG. 3AB, which is identical to that in FIG. 2B, for example, it is assumed that the ratio between the total number of accesses to the 6-Gbps hard disk drives 16 and the total number of accesses to the 3-Gbps hard disk drive is 1:3, as shown in FIG. 3AA.

In this case, the disk array system 3 uses the following equation to calculate, for the wide link 17 connecting the first and second SAS expanders 15, the ratio of the number of physical links that are to be allocated to each of the 6 Gbps and 3 Gbps link rates.

[Math.4]

$$(6 \text{ Gbps} \times 6 \text{ devices} \times 1):(3 \text{ Gbps} \times 4 \text{ devices} \times 1) \tag{4}$$

In this example, since equation (4) is 1:1, the disk array system 3 uses the ratio 1:1 to proportionally distribute the four physical links 17A that form part of the wide link 17 between the SAS controller 14 and the first SAS expander 15, allocating two physical links 17A to the 6-Gbps link rate and two physical links 17A to the 3-Gbps link rate. The disk array system 3 then accesses the 6-Gbps hard disk drives 16 only via the physical links 17A allocated to the 6-Gbps hard disk drives 16, and accesses the 3-Gbps hard disk drives 16 only via the physical links 17A allocated to the 3-Gbps hard disk drives 16.

Furthermore, as shown in FIG. 3AC, if the ratio between the total number of accesses to the 6-Gbps hard disk drives 16 connected to the second SAS expander 15 and the total number of accesses to the 3-Gbps hard disk drives 16 is 1:6, the disk array system 3 uses the following equation to calculate, for the wide link 17 connecting the first and second SAS expanders 15, the ratio of the number of physical links that are to be allocated to each of the 6 Gbps and 3 Gbps link rates.
[Math.5]

$$(6\ Gbps \times 3\ devices \times 1):(3\ Gbps \times 2\ devices \times 3) \quad (5)$$

In this example, since equation (5) is 1:1, the disk array system 3 uses the ratio 1:1 to proportionally distribute the four physical links 17A that form part of the wide link 17 between the first and second SAS expanders 15, allocating two physical links 17A to the 6-Gbps link rate and two physical links 17A to the 3-Gbps link rate. The disk array system 3 then accesses the 6-Gbps hard disk drives 16 only via the physical links 17A allocated to the 6-Gbps hard disk drives 16, and accesses the 3-Gbps hard disk drives 16 only via the physical links 17A allocated to the 3-Gbps hard disk drives 16.

Note that in the case of this embodiment, in the disk array system 3, a plurality of logical links are set by logically dividing a single physical link 17A, thereby also enabling data transfer (multiplexed transfer) to different hard disk drives via the respective logical links. Furthermore, in the case of this disk array system 3, such a logical division and multiplexed transfer mode can be set for each physical link 17A.

For example, in a case where, as per FIG. 4A, the SAS controller 14 and the SAS expander 15 are connected by a wide link 17 configured from the two physical links 17A, and where the two first hard disk drives 16 with a 3 Gbps link rate and one second hard disk device 16 with a 6 Gbps link rate are connected to the SAS expander 15, the disk array system 3 logically divides one of the physical links 17A into two logical links and sets multiplexed transfer mode as the transfer mode of the physical link 17A.

The disk array system 3 then performs a data transfer with respect to one of the first hard disk drives 16 via one of the logical links of the two logical links obtained by this logical division and performs data transfer with the other of the second hard disk drives 16 via the other of the logical links.

In this case, as shown in FIG. 4B, for example, when performing a data transfer to one of the first hard disk drives 16 during periods when there is no access to the other of the first hard disk drives 16, the disk array system 3 matches the connection speed to 3 Gbps by inserting correction data for rate matching into the data being transferred.

Figure 3B:
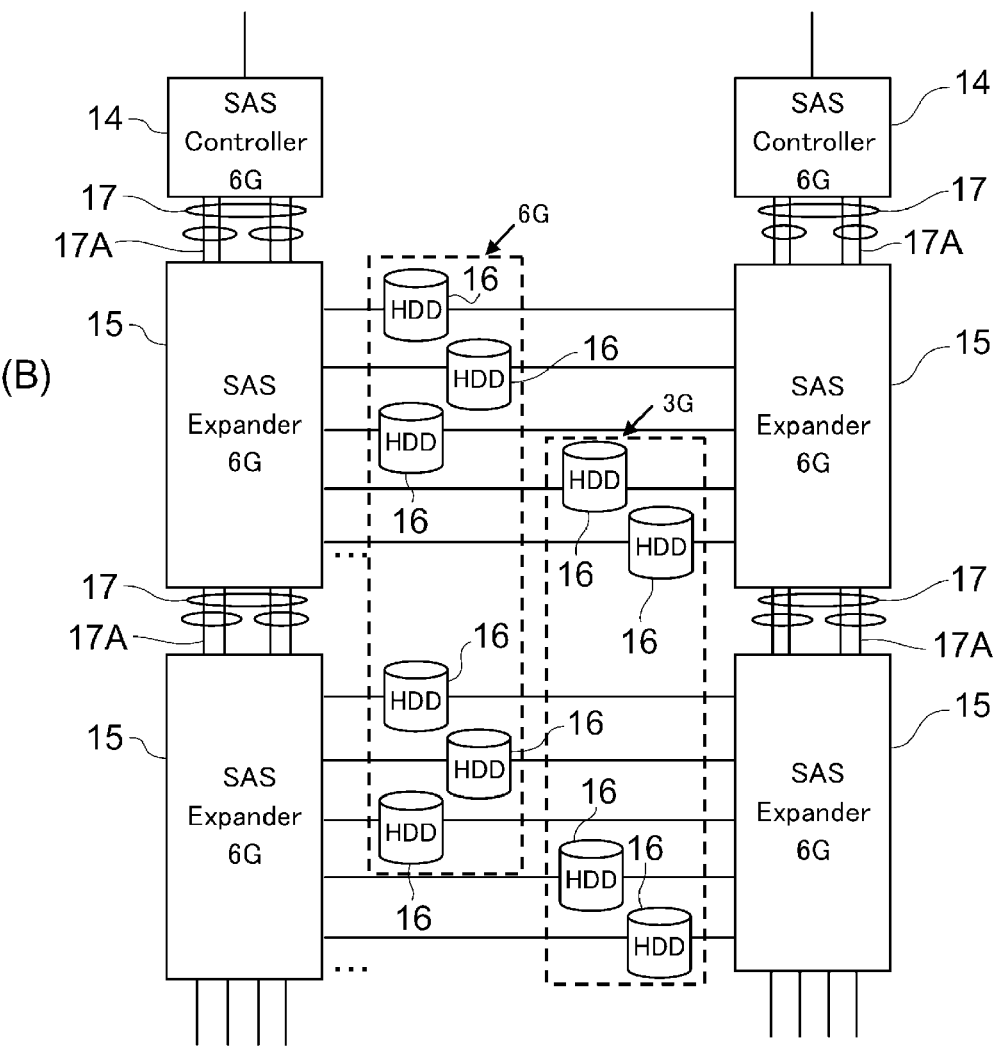
FIG. 3B A to C are tables and a block diagram serving to explain link allocation processing to which a multiplexed transfer function is applied.

Hence, in an environment of FIG. 3BB, which is identical to that of FIG. 3AB, for example, the ratio between the total number of accesses to the 6-Gbps hard disk drive 16 and the total number of accesses to the 3-Gbps hard disk drive 16 is 1:6 as shown in FIG. 3BA, and multiplexed transfer mode is set for the hard disk drives 16 with a link rate of 3 Gbps so that a single physical link 17A is used by two devices.

In this case, the disk array system 3 uses the following equation to calculate, for the wide link 17 connecting the first and second SAS expanders 15, the ratio of the number of physical links that are to be allocated to each of the 6 Gbps and 3 Gbps link rates.
[Math.6]

$$(6\ Gbps \times 6\ devices \times 1):(3\ Gbps \times 4\ devices \times 6/2) \quad (6)$$

In this example, since equation (6) is 1:1, the disk array system 3 uses the ratio 1:1 to proportionally distribute the four physical links 17A that form part of the wide link 17 between the SAS controller 14 and the first SAS expander 15, allocating two physical links 17A to the 6-Gbps link rate and two physical links 17A to the 3-Gbps link rate. The disk array system 3 then accesses the 6-Gbps hard disk drives 16 only via the physical links 17A allocated to the 6-Gbps hard disk drives 16, and accesses the 3-Gbps hard disk drives 16 only via the physical links 17A allocated to the 3-Gbps hard disk drives 16.

Furthermore, as shown in FIG. 3BC, in a case where the ratio between the total number of accesses with respect to the 6-Gbps hard disk drives 16 connected to the second SAS expander 15 and the total number of accesses with respect to the 3-Gbps hard disk drives 16 is 1:6, the disk array system 3 uses the following equation to calculate, for the wide link 17 connecting the first and second SAS expanders 15, the ratio of the number of physical links that are to be allocated to each of the 6 Gbps and 3 Gbps link rates.
[Math.7]

$$(6\ Gbps \times 3\ devices \times 1):(3\ Gbps \times 2\ devices \times 6/2) \quad (7)$$

In this example, since equation (7) is 1:1, the disk array system 3 uses the ratio 1:1 to proportionally distribute the four physical links 17A that form part of the wide link 17 between the first and second SAS expanders 15, allocating two physical links 17A to the 6-Gbps link rate and two physical links 17A to the 3-Gbps link rate. The disk array system 3 then accesses the 6-Gbps hard disk drives 16 only via the physical links 17A allocated to the 6-Gbps hard disk drives 16, and accesses the 3-Gbps hard disk drives 16 only via the physical links 17A allocated to the 3-Gbps hard disk drives 16.

In addition, a third feature of the disk array system 3 according to this embodiment is the fact that a link allocation switching function is also built in for switching the aforementioned allocation of the physical links 17A to the link rates according to a schedule created beforehand by the user (called a 'user schedule' hereinbelow) or to an access status for each previous link rate.

In actual fact, in the disk array system 3, the user is able to create and register, for each wide link 17 connecting the SAS controller 14 to the SAS expander 15 and connecting the SAS expanders 15, a schedule for changing the number of physical links 17A allocated to each link rate with the desired timing (called the 'user schedule' hereinbelow).

If such a user schedule has been registered, the disk array system 3 then populates a switching schedule which is a schedule for switching the number of physical links allocated to each link rate with the user schedule, and then switches the number of physical links 17A allocated to each link rate at the designated time in accordance with the switching schedule.

In addition, even if such a user schedule has been registered, when a predetermined operating mode (called 'link allocation switching automatic mode' hereinbelow) has been set, the disk array system 3 creates a switching schedule on the basis of the ratio between the total number of previous accesses to the hard disk drives 16 of each link rate, and switches the number of physical links 17A allocated to each link rate on the basis of the switching schedule, and the ratio of the total number of accesses to the hard disk drives 16 of the preceding link rate (called the access ratio hereinbelow).

More specifically, the disk array system 3 stores the ratio (access ratio) in each case of the total number of accesses to the hard disk drives 16 of each link rate as access ratio information for each time zone when a single day is divided up using a preset fixed time interval (called a 'link allocation switching interval' hereinbelow).

The disk array system 3 then creates a switching schedule that comprises a reference schedule corresponding to a schedule management cycle, the reference schedule drawing from access ratio information of a corresponding previous date in the cycle of a preset switching schedule (one day, one week, one month, or one year or the like, referred to hereinbelow as a 'schedule management cycle'). Note that a corresponding day in the past in the schedule management cycle is the previous day if the schedule management cycle is one day, a day one week prior if this cycle is one week, a day one month prior if the cycle is one month, and a day one year prior in the case of an annual cycle.

The disk array system 3 then, with the timing with which the time zone is switched, determines the ratio of the number of physical links assigned to each of the link rates in the next time zone in accordance with the switching schedule and the access ratio of each link rate in the preceding time zone, and allocates physical links 17A in a number that corresponds to each link rate depending on the determination result.

Note that, in the course of this processing, the disk array system 3 uses access ratio information from the previous day as the reference schedule if access ratio information for a corresponding day in the past in the schedule management cycle is not retained, for example. Furthermore, the disk array system 3 uses the access ratio for each link rate obtained from the measurement in the preceding time zone to allocate the number of physical links to each link rate in the next time zone, if the access ratio information from the previous day is not retained.

The specific operation of the disk array system 3 relating to the abovementioned link allocation switching function will now be explained with reference to FIG. 5. In this example, a link allocation switching interval that is set for the disk array system 3 is 30 minutes and the schedule management cycle is one week.

As shown in row '1' of FIG. 5A-1, no reference schedule exists on the first day of the first week, and therefore the disk array system 3 determines the number of physical links 17A to be allocated to each link rate on the basis of the access ratio of each link rate in the preceding time zone for each time zone. In so doing, the disk array system 3 also records the access ratio of each link rate in each time zone as shown in row '1' of FIG. 5A-2.

Furthermore, from the second day onwards of the first week, the disk array system populates the switching schedule with a reference schedule derived from the access ratios of each link rate in each time zone of the previous day as shown in rows '2' to '7' in FIG. 5A-1.

In addition, the disk array system 3 compares the access ratios of the switching schedule with those of the respective link rates in the preceding time zone and determines the number of physical links 17A to be allocated to each link rate for each time zone as shown in rows '2' to '7' of FIG. 5A-3 in accordance with the switching schedule when the difference between these access ratios falls within a prescribed range that is determined beforehand, and in accordance with the access ratios of each link rate in the preceding time zone when this difference exceeds this prescribed range. Furthermore, the disk array system 3 allocates the physical links 17A in a number that corresponds to each of the link rates in accordance with the result determined Thereupon, thief disk array system 3 records the access ratios of the respective link rates in each time zone as shown in rows '2' to '7' of FIG. 5A-2 respectively.

From the second week onwards, the disk array system 3 populates the switching schedule with a reference schedule derived from the access ratios of each link rate in each time zone of the previous week as shown in FIG. 5B-1.

The disk array system 3 then determines, on the basis of the switching schedule and the access ratios of each link rate in the preceding time zone, the number of physical links 17A to be allocated to each link rate as mentioned earlier and for each time zone as shown in FIG. 5B-3. The disk array system 3 then allocates the physical links 17A in the numbers corresponding to each link rate in accordance with the result determined In so doing, the disk array system 3 records the access ratios of each link rate in each time zone as shown in FIG. 5B-2 and uses the access ratios for the reference schedule of the following week.

(3) Backend Information

Figure 6:
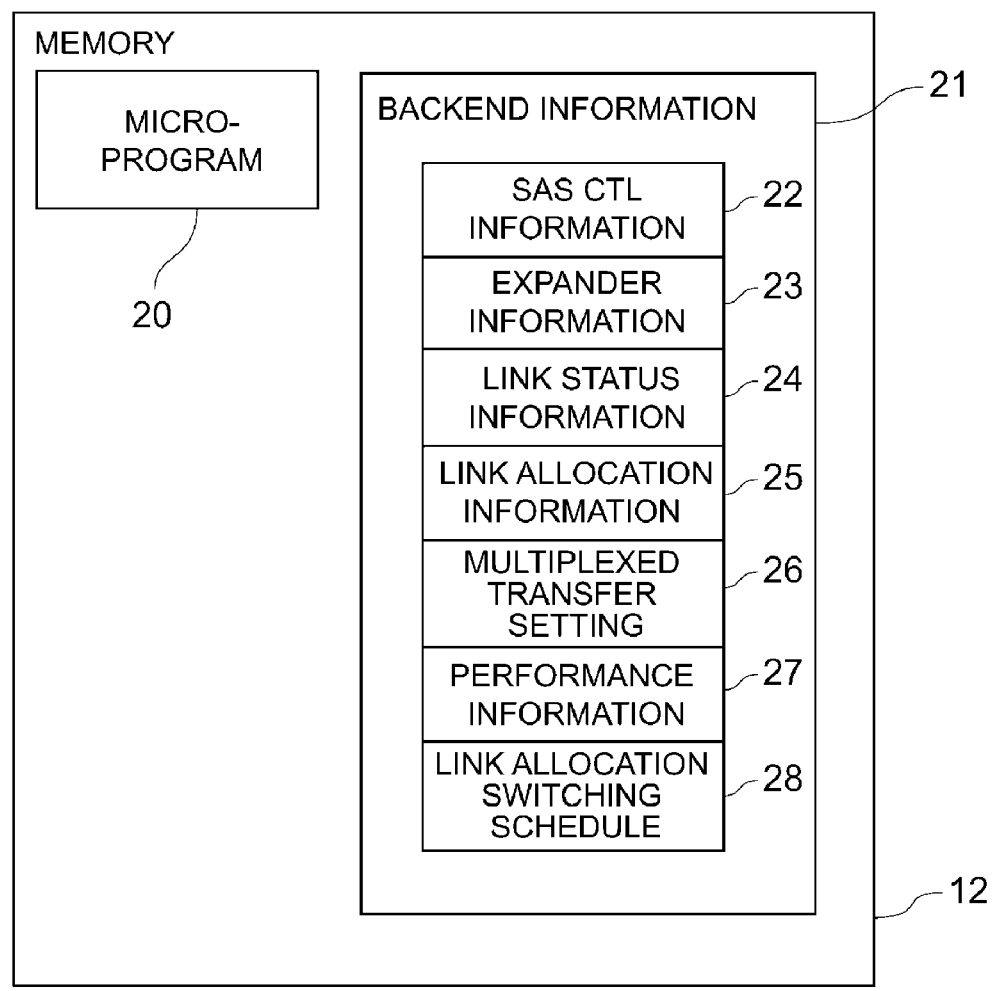
FIG. 6 Conceptual view serving to explain a microprogram and backend information.

As a means for realizing the above-described traffic control of this embodiment, backend information 21 is stored in each memory 12 (FIG. 1) of channels 0 and 1, in addition to the aforementioned microprogram 20 as shown in FIG. 6.

The backend information 21 is information for managing the backend unit 18 (FIG. 1) and is configured from SAS controller information 22, expander information 23, link status information 24, link allocation information 25, multiplexed transfer information 26, performance information 27, and link allocation switching schedule information 28.

The SAS controller information 22 is information for managing the SAS expanders 15 and the hard disk drives 16 that are connected to the SAS controllers 14 and, as shown in FIG. 7, includes the numbers, by link rate, of SAS expanders 15 connected to the SAS controllers 14 of their own system, and numbers, by link rate, of hard disk drives 16 that exist in the backend unit 18.

In addition, the expander information 23 is information relating to the individual SAS expanders 15 that exist in the backend unit 18 and, as shown in FIG. 8, include, for each SAS expander, the number of other SAS expanders 15 connected to the SAS expander 15 concerned, report general information (described subsequently) that is transmitted from the SAS expander 15, and, for each physical PHY of the SAS expander 15, information relating to the devices connected to the physical PHY via the physical links 17A (called 'connected device information' hereinbelow).

Note that physical PHY denotes a communication modem part that comprises a SerDes (Serializer/DeSerializer: serial/parallel conversion circuit) for example. The SAS controllers 14 and SAS expanders 15 comprise one physical PHY for one physical link 17A connected to the SAS controllers 14 and SAS expanders 15 respectively. Connected device information is information including the types of other devices connected to the corresponding physical PHY, as well as the link rates of the other devices and the device SAS addresses.

The link status information 24 is information representing the link statuses of the physical PHY of each of the SAS controllers 14 and SAS expanders 15 forming the backend unit 18. As shown in FIG. 9, the information 24 includes the status of each physical PHY of the SAS controllers 14 (no fault "active" or fault "down") and the status of each physical PHY of the SAS expanders 15 ("active" or "down").

The link allocation information 25 is information for managing the link rate allocated to each physical PHY of each of the SAS controllers 14 and the SAS expanders 15 that form the backend unit 18 and, as shown in FIG. 10, include information representing the link rates (3 Gbps, 6 Gbps, 12 Gbps . . . ) set for each physical PHY of the SAS controllers 14 and each physical PHY of the SAS expanders 15.

The multiplexed transfer information 26 is information for managing whether or not the multiplexed transfer mode has been set for each physical PHY of the SAS controllers 14 and SAS expanders 15 forming the backend unit 18 and, as shown in FIG. 11, includes information representing the existence of a multiplexed transfer setting for each physical PHY of the SAS controllers 14 and each physical PHY of the SAS expanders 15 (valid is 'enable', and invalid is 'disable').

The performance threshold value information 27A is information relating to the performance of the backend unit 18 and is configured from information relating to threshold values for the performance of the backend unit 18 as shown in FIG. 12 (called "performance threshold value information" hereinbelow) 27A and information relating to the current performance which is collected from the backend unit 18 as shown in FIG. 13 (called "monitoring performance information" hereinbelow) 27B.

The performance threshold value information 27A includes information relating to the performance limit (called 'performance limit information' hereinbelow) 27AA of the backend unit 18 as decided by the specifications and so on of the backend unit 18, information relating to the performance required by the user (called 'user required performance information' hereinbelow) 27AB, and information relating to the maximum value for the performance measurement value for each fixed performance monitoring time (called maximum measured value information hereinbelow) 27AC.

Furthermore, the system performance limit information 27AA, the user required performance information 27AB, and maximum measured value information 27AC each include the IOPS of the whole backend unit 18, the IOPS of each path in the backend unit 18, the IOPS of each port (physical PHY of the device), and the ratio of accesses (access ratio) for each link rate.

Furthermore, the monitoring performance information 27B is information relating to the overall performance of the backend unit 18 that is acquired at regular intervals and, as shown in FIG. 13, includes information relating to the IOPS of the whole backend unit 18, the IOPS of each path in the backend unit 18, and information relating to the IOPS for each port.

The link allocation switching schedule information 28 includes at least a user schedule, and access ratio change information corresponding to at least a schedule management cycle. Furthermore, information representing a switching schedule is also included if the link allocation switching automatic mode is set as an operating mode.

Note that, if the link rates of the SAS controllers 14, the SAS expanders 15, and the hard disk drives 16 that form the backend unit 18 are all the same, the link allocation information 25 (FIG. 10), the multiplexed transfer information (FIG. 11), and the link allocation switching schedule information 28 (FIG. 14) are unnecessary.

(4) Microprogram Processing Relating to Traffic Control

The specific content of processing by the disk array system 3 relating to traffic control of this embodiment will be described next. Note that the subject of the various processing will be explained hereinbelow as 'microprogram' but it goes without saying that in reality the corresponding processing is executed by the CPU 11 (FIG. 11) on the basis of this microprogram 20.

(4-1) Traffic Control Processing when Link Rates are the Same

Figure 15:
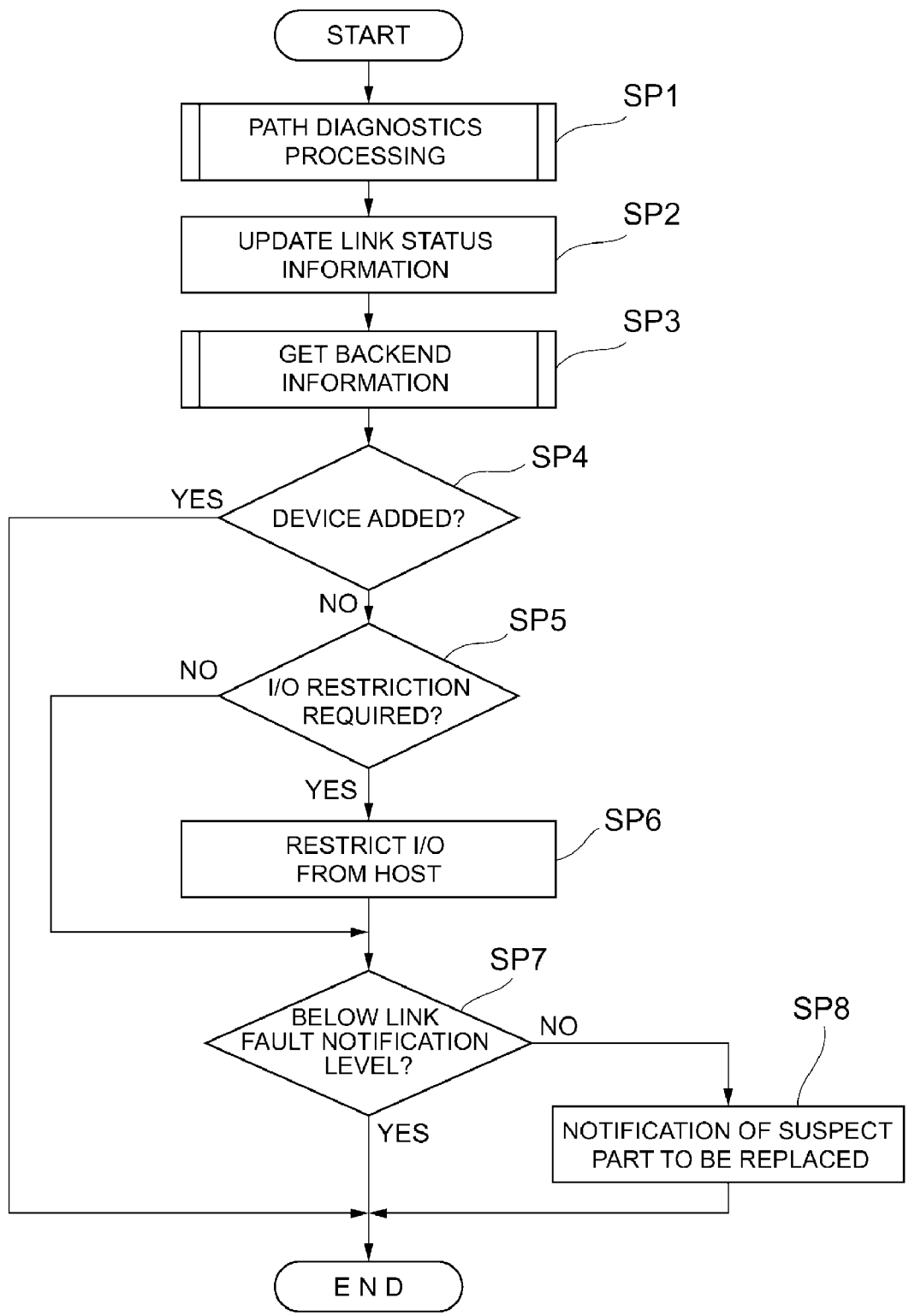
FIG. 15 Flowchart showing a processing procedure of first traffic control processing.

FIG. 15 shows the content of processing by the microprogram 20 relating to traffic control if the link rates of the hard disk drives 16 in the backend unit 18 are all the same.

The microprogram 20 starts the first traffic control processing shown in FIG. 15 during device rise time when the power source of the disk array system 3 is switched ON, or upon receiving notice from the SAS controllers 14 of a change in the number of devices or the occurrence of a link fault in the backend unit 18. The microprogram 20 then first checks for the existence of a link fault in the backend unit 18 by executing predetermined path diagnostics processing and when a link fault occurs in the backend unit 18, specifies the location of the fault (SP1).

The microprogram 20 then updates the earlier-mentioned link status information 24 for FIG. 9 on the basis of the link status ('active' or 'down') of each physical PHY of the SAS controllers 14 and SAS expanders 15 obtained by this path diagnostics processing (SP2).

By executing discovery processing, the microprogram 20 subsequently collects, within the backend information 21 (FIG. 6), the latest information for the SAS controller information 22 (FIG. 7), the SAS expander information 23 (FIG. 8), the link status information 24 (FIG. 9) and the link allocation information 25 (FIG. 10), and monitoring performance information 27B (FIG. 13) of the performance information 27 (FIG. 6) (SP3).

The microprogram 20 then judges whether or not the reason for initiating the first traffic control processing is that notification of a change in the number of devices has been transmitted from the SAS controllers 14 (SP4). The microprogram 20 then ends the first traffic control processing when this judgment yields an affirmative result.

However, the microprogram 20 judges whether or not an I/O restriction on the host device 2 is required when the judgment of step SP4 yields a negative result (SP5). Specifically, the microprogram 20 constantly measures the time from when a command is received from the host device 2 until the command is executed, judging that an I/O restriction is required if this time exceeds a preset threshold value, and judging an I/O restriction to be unnecessary if this time does not exceed the threshold value.

The microprogram 20 then advances to step SP7 when the judgment of step SP5 yields a negative result, but restricts I/O from the host device 2 when an affirmative result is obtained (SP6). For example, the microprogram 20 imposes an I/O restriction on the host device 2 by restricting the number of commands (number of processing queues) that can be received from the host device 2.

Thereafter, the microprogram 20 judges whether or not the current performance of the backend unit 18 is in a state where the system administrator need not be notified that a link fault has occurred by comparing the current various performances of the backend unit 18 that were collected in step SP3 with the threshold values of the performances obtained on the basis of the performance threshold value information 27A (FIG. 12) in the backend information 21 (FIG. 6) stored in the memory 12 (SP7).

When this judgment yields an affirmative result, the microprogram 20 then ends the first traffic control processing. However, when the judgment of step SP7 yields a negative result, the microprogram 20 sends notification to the system administrator with information indicating that a link fault has occurred and the location of the fault, together with a warning urging the system administrator to replace the faulty part (SP8). More specifically, the microprogram 20 causes the management client 4 to display this information and warning by transmitting the required command and information to the management client 4. The microprogram 20 subsequently ends the first traffic control processing.

(4-2) Traffic Control Processing when Link Rates are Mixed

Figure 16:
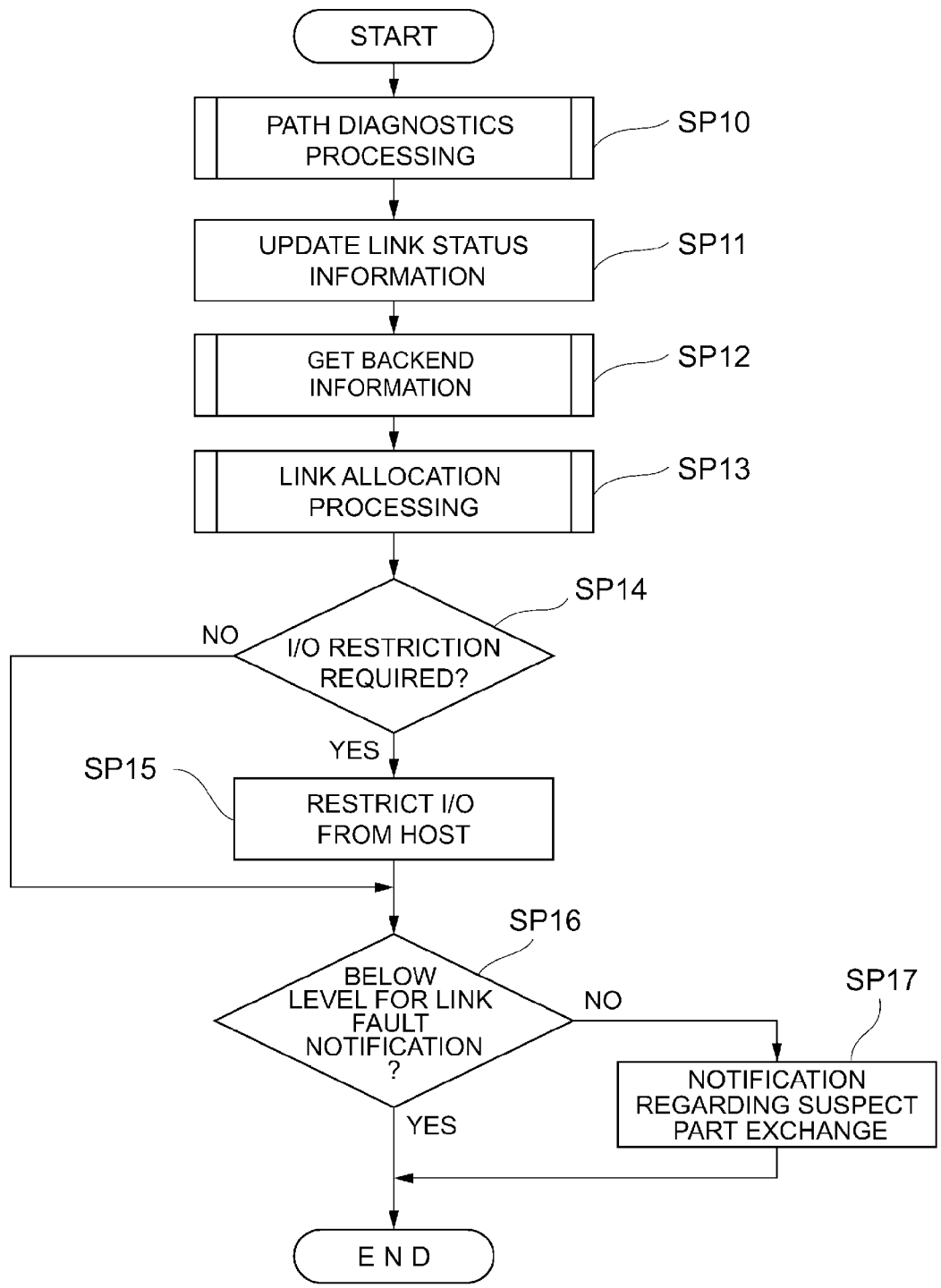
FIG. 16 Flowchart showing a processing procedure of second traffic control processing.

Meanwhile, FIG. 16 shows the content of processing by the microprogram 20 relating to traffic control in a case where the backend unit 18 contains a mixture of different types of hard disk drives 16 having different link rates.

The microprogram 20 starts second traffic control processing shown in FIG. 16 during device rise time when the power source of the disk array system 3 is switched ON, or upon receiving notice from the SAS controllers 14 of a change in the number of devices or the occurrence of a link fault.

The microprogram 20 then executes path diagnostics processing, updates the link status information 24 of the backend information 21 (FIG. 6), and executes processing to collect the backend information 21 by processing steps SP10 to SP12 in the same way as steps SP1 to SP3 of the first traffic control processing described earlier with reference to FIG. 15.

The microprogram 20 then sets the SAS controllers 14 to allocate, to each link rate, physical links 17A forming part of the corresponding wide link 17 in the backend unit 18 on the basis of the collected backend information 21, and updates the link allocation information 25 (FIG. 10) of the backend information 21 according to this setting (SP13).

The microprogram 20 subsequently processes steps SP14 to SP17 in the same way as steps SP5 to SP8 of the first traffic control processing described earlier with reference to the drawings, and then ends the second traffic control processing.

(4-3) Path Diagnostics Processing

Figure 17:
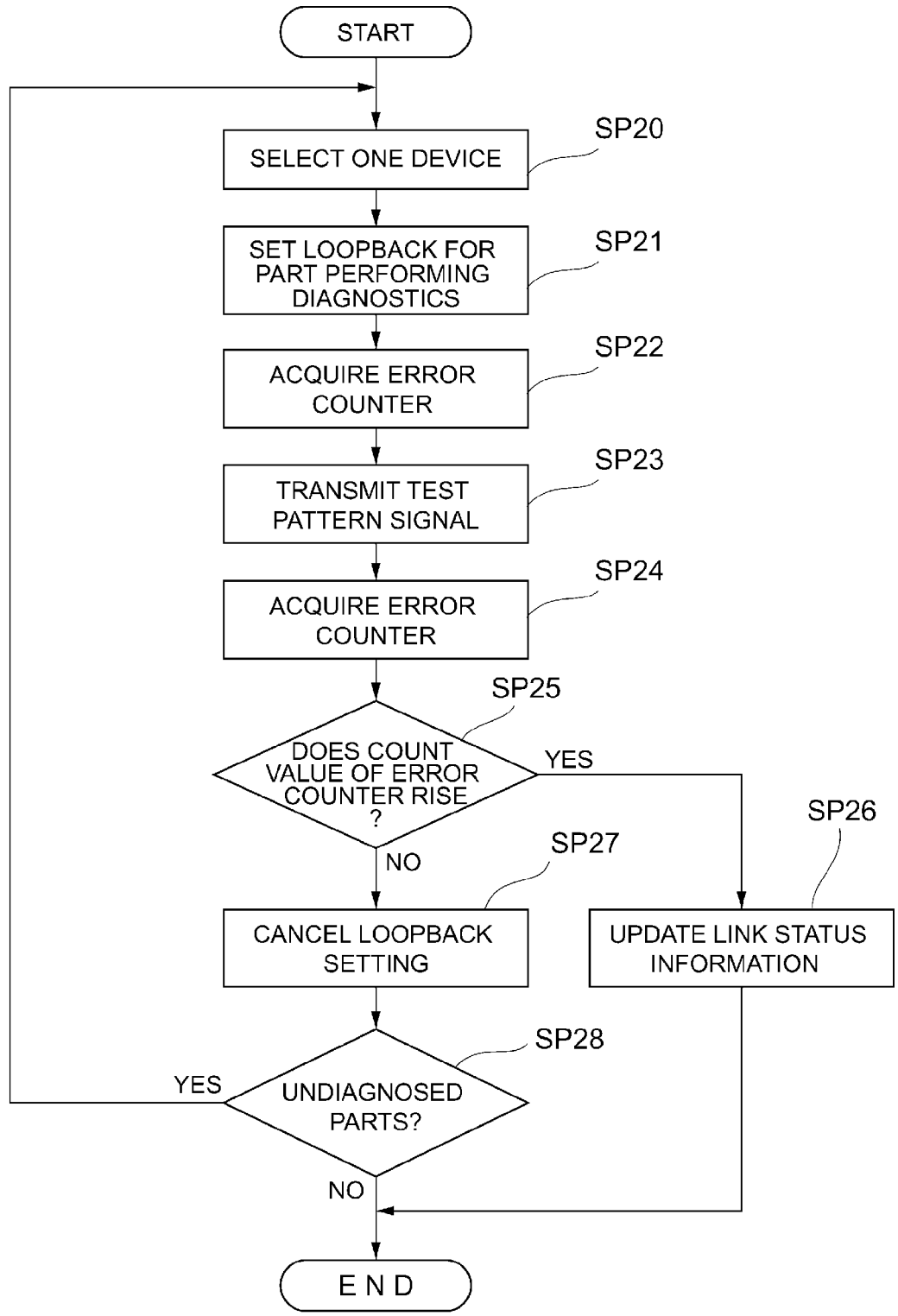
FIG. 17 Flowchart showing a processing procedure of path diagnostic processing.

FIG. 17 shows the processing procedure of the path diagnostics processing that is executed by the microprogram 20 in step SP1 of the first traffic control processing (FIG. 15) or step SP10 of the second traffic control processing (FIG. 16).

Upon moving to step SP1 of the first traffic control processing (FIG. 15) or step SP10 of the second traffic control processing (FIG. 16), the microprogram 20 starts the path diagnostics processing shown in FIG. 17 and first selects one device (SAS controller 14 or SAS expander 15) which is to be diagnosed in the backend unit 18 and one physical PHY of the device (SP20).

At this time, the microprogram 20 refers to the link status information 24 (FIG. 9) of the backend information 21, initially selects an SAS controller 14 as the device, and then selects the connected parts sequentially starting with the SAS expander 15 closest to the SAS controller.

The microprogram 20 then makes a backup setting for the physical PHY of the device via the SAS controller 14 (SP21).

The microprogram 20 subsequently acquires the count value of the error counter of the physical PHY selected in step SP20 from the device selected in step SP20 and retains the acquired count value as the pre-diagnosis count value (SP22).

The microprogram 20 then transmits a test pattern signal to the physical PHY of the device by controlling the SAS controllers 14 (SP23), acquires the count value of the error counter for the physical PHY selected in step SP20 from the device selected in this step SP, and retains the acquired count value as the post-diagnosis count value (SP24).

The microprogram 20 then compares the count value acquired in step SP20 with the count value acquired in step SP24 and judges whether the count value of the error counter has risen since the test pattern signal was transmitted (SP25).

When this judgment yields an affirmative result, the microprogram 20 judges the physical PHY of the device to be a faulty part and updates the status of the physical PHY in the link status information 24 (FIG. 9) to "faulty ('down')" (SP26). The microprogram 20 then ends the path diagnosis processing.

However, when the judgment of step SP25 yields a negative result, the microprogram 20 cancels the loop back setting for the physical PHY of the device (SP27), and judges whether or not there are any undiagnosed physical PHY present (whether or not diagnosis is complete for all the physical PHY of all the devices) (SP28).

If the judgment yields a negative result, the microprogram 20 returns to step SP20 and repeats the processing for steps SP20 to SP28 while sequentially switching the physical PHY selected in step SP20 to another physical PHY (another physical PHY of the same device or a physical PHY of another device).

The microprogram 20 ends the path diagnosis processing before long when step SP28 yields an affirmative result upon completion of the diagnosis of all the physical PHY of all the devices in the backend unit 18.

(4-4) Backend Information Collection Processing

Figure 18:
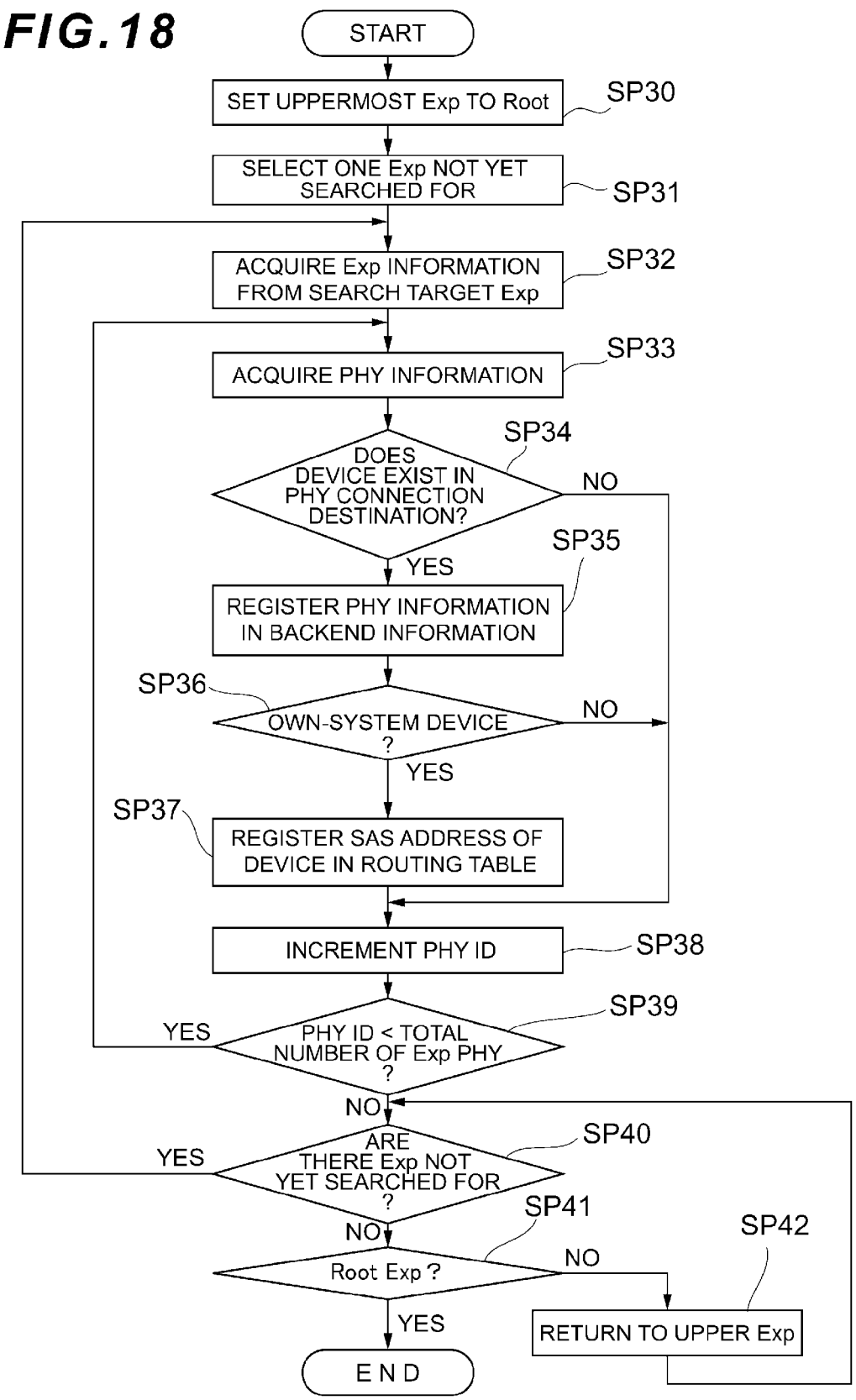
FIG. 18 Flowchart showing a processing procedure of backend information collection processing.

Meanwhile, FIG. 18 shows the processing procedure of the backend information collection processing that is executed by the microprogram 20 in step SP3 of the first traffic control processing (FIG. 15) or step SP12 of the second traffic control processing (FIG. 16).

Upon advancing to step SP3 of the first traffic control processing or step SP12 of the second traffic control processing, the microprogram 20 starts the backend information collection processing shown in FIG. 18, and first sets the uppermost SAS expander 15 (the SAS expander 15 that is directly connected to the SAS controller 14) as the 'root SAS expander' (SP30).

The microprogram 20 then selects one SAS expander 15 for which the collection of connected device information is not complete for all the physical PHY. The microprogram 20 also initializes (sets at '0') the identifiers (called "search target PHY IDs" hereinbelow) of the physical PHY subjected to the search (SP31).

The microprogram 20 then issues an SMP report general request, which is an SAS-standard SMP (Serial Management Protocol) command set, to the SAS expander 15 selected in step SP31 (SP32). In response to this request, the microprogram 20 is thus able to acquire information (report general information) such as the total number of physical PHY of the SAS expander 15 and the number of entries in the routing table set in the SAS expander 15.

The microprogram 20 then designates the current search target PHY ID as the identifier of the physical PHY to be targeted for the SAS expander selected in step SP31 and issues an SMP Discovery Request defined by the SAS standard (SP33). As a result, if any device (SAS controller 14, SAS expander 15 and/or hard disk drive 16) is connected to the physical PHY, the microprogram 20 is able to acquire information relating to the device such as the device type, link rate, and connection-destination SAS address (called the PHY information hereinbelow). The microprogram 20 then updates expander information 23 (FIG. 8) on the basis of the acquired PHY information.

The microprogram 20 then judges whether or not any device is connected to the targeted physical PHY on the basis of the PHY information acquired in step SP33 (SP34). When this judgment yields a negative result, the microprogram 20 then advances to step SP38.

However, when the judgment of step SP34 yields an affirmative result, the microprogram 20 analyzes the PHY information acquired in step SP33 and updates the SAS controller information 22 (FIG. 7) and so forth of the backend information 21 on the basis of the number of SAS expanders and the number of hard disk drives and so on connected to the device obtained from this analysis (device judged to be connected to the targeted physical PHY).

The microprogram 20 subsequently judges whether or not the device detected in step SP34 is an own-system device (SP36). When this judgment yields a negative result, the microprogram 20 then advances to step SP38.

However, when the judgment of step SP36 yields an affirmative result, the microprogram 20 registers the SAS address of the device detected in step SP34 in a routing table retained by each of the SAS expanders 15 that exist between the SAS controller 14 and the SAS expander 15 comprising the physical PHY being targeted (SP37).

In addition, the microprogram 20 increases the value of the search target PHY ID by one (SP38) and then judges whether or not the value of the search target PHY ID is smaller than the number of physical PHY that the SAS expander 15 selected in step SP31 comprises (SP39).

The microprogram 20 returns to step SP33 when the judgment yields an affirmative result and then repeats the processing of steps SP33 to SP39. The microprogram 20 judges before long whether or not unsearched for SAS expanders 15 exist when a negative result is obtained in step S39 upon completion of the processing of steps SP33 to SP38 for all the physical PHY of the SAS expander 15 being targeted (the SAS expander 15 selected in step SP31) (SP40).

The microprogram 20 then returns to step SP31 when this judgment yields an affirmative result and then repeats the processing of steps SP31 to SP40. The microprogram 20 judges before long whether or not the current target SAS expander 15 is a 'root SAS expander' when a negative result is obtained in step SP40 upon completion of the processing of steps SP31 to SP39 for all of the SAS expanders 15 (SP41).

When this judgment yields a negative result, the microprogram 20 sets the SAS expander 15 being targeted to reflect that this SAS expander 15 has been searched and then selects an upper SAS expander 15 that is closer to the SAS controller 14 than this SAS expander 15 (SP42).

The microprogram 20 subsequently returns to step SP40 and then repeats the same processing until an affirmative result is obtained in step SP41. The microprogram 20 then ends the backend information collection processing upon reaching the 'root SAS expander' before long.

(4-5) Link Allocation Processing

Figure 19:
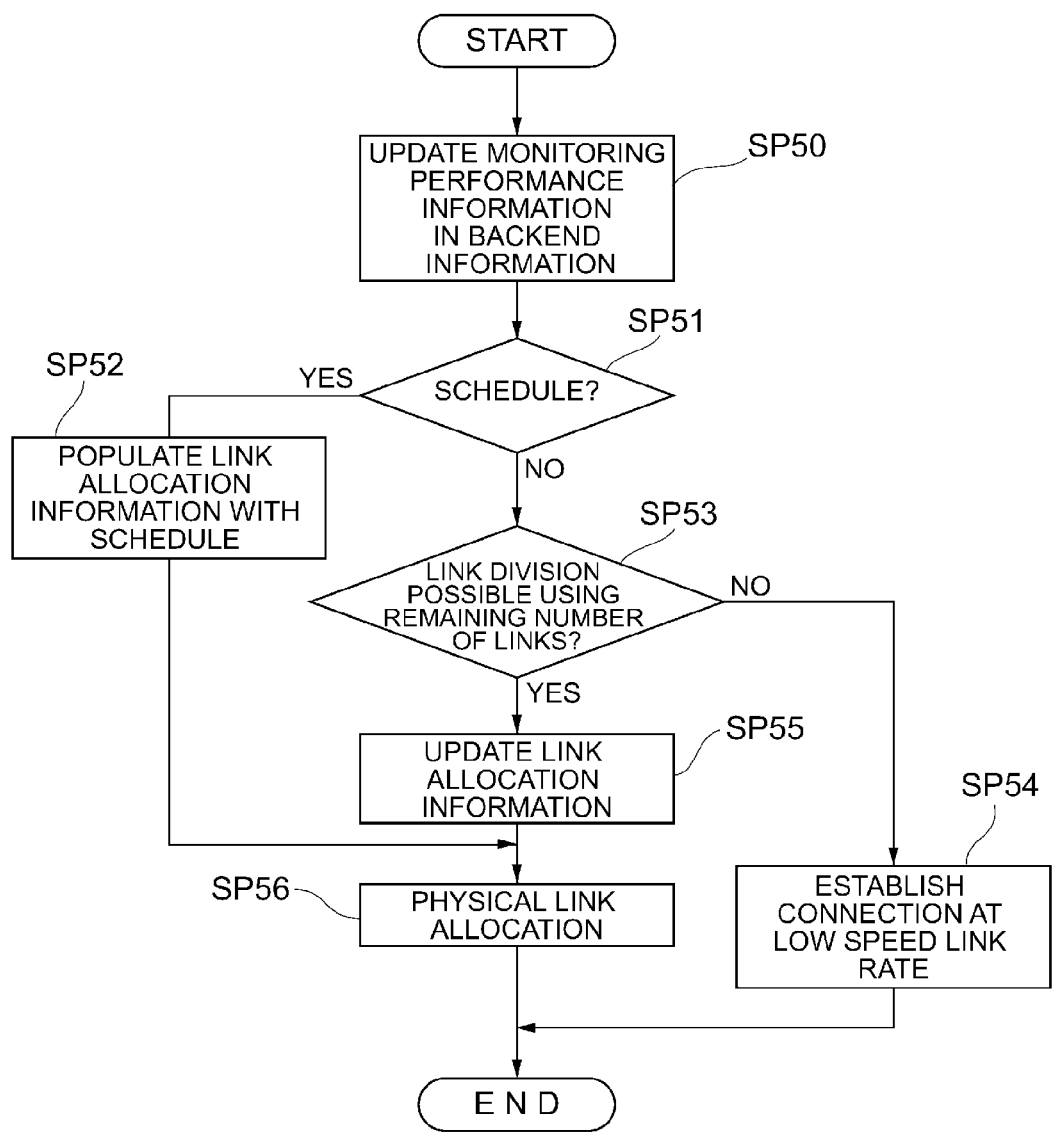
FIG. 19 Flowchart showing a processing procedure of link allocation processing.

Meanwhile, FIG. 19 shows the processing procedure of the link allocation processing that is executed by the microprogram 20 in step SP13 of the second traffic control processing (FIG. 16). Note that the link allocation processing is executed by the microprogram 20 even when it is time to update the number of physical links 17A to be allocated to each link rate in the user schedule or switching schedule.

Upon advancing to step SP13 of the second traffic control processing or when a time where the number of physical links 17A allocated to each link rate in the user schedule is reached, the microprogram 20 starts the link allocation processing shown in FIG. 19. The microprogram 20 then first acquires information relating to the performance of the backend unit 18 (FIG. 1) collected as a result of the microprogram 20 regularly issuing a command to the SAS controllers 14, and updates the monitoring performance information 27B (FIG. 13) of the backend information 21 (FIG. 6) on the basis of the acquired information (SP50).

The microprogram 20 then judges whether or not the reason for initiating the link allocation processing is a schedule (user schedule or switching schedule) (SP51). When this judgment yields an affirmative result, the microprogram 20 populates the link allocation information 25 (FIG. 10) with the schedule (SP52) and then advances to step SP56.

However, when the judgment of step SP51 yields a negative result, the microprogram 20 judges, for the wide links (FIG. 1) serving as targets, whether it is possible to allocate the remaining physical links 17A (FIG. 1) that form part of the wide link 17 for each of the link rates (SP 53).

Note that the phrase 'wide links serving as targets' mentioned here denotes all the wide links 17 in the backend unit 18 if the reason for initiating the second traffic control processing is that the 'power source of the disk array system 3 is switched ON', and denotes the affected wide links 17 in the back end unit 18 if the reason for initiating the second traffic control processing is that 'notification is received from the SAS controller 14 that a link fault has occurred or the number of devices has changed.'

Furthermore, the judgment in step SP53 is made on the basis of the number of remaining physical links 17A with respect to the link rate type. For example, the microprogram 20 is able to allocate the remaining physical links 17A to each of the link rates if there are two or more physical links 17A having an 'active' link status among wide links 17 having mixed 3 Gbps and 6 Gbps link rates, and judges that the remaining physical links 17A cannot be allocated to the link rates if there is only one physical link 17A having an 'active' link status. In addition, the microprogram 20 is able to allocate, in the wide links 17 having a mixture of link rates 3 Gbps, 6 Gbps, and 12 Gbps, the remaining physical links 17A to each link rate as long as there are three or more physical links 17A having an 'active' link status and judges, if there are only two physical links 17A having an 'active' link status, that the remaining physical links 17A cannot be allocated to each of the link rates.

When the judgment of step SP53 yields a negative result, the microprogram 20 then sets a connection with a low-speed link rate (SP54), and then ends the link allocation processing.

However, when the judgment of step SP53 yields a negative result, the microprogram 20 determines, for each targeted wide link 17, the number of physical links that should be allocated to each link rate by the above method with reference to FIGS. 2 and 3 and updates the link allocation information 25 (FIG. 10) of the backend information 21 on the basis of the result determined (SP55).

The microprogram 20 then allocates, for each targeted wide link 17, the physical links 17A to each link rate on the basis of the link allocation information 25 updated in step SP52 or SP55 (SP56). The allocation of the physical links 17A is performed by updating the multiplexed transfer information 26 (FIG. 11) of the backend information 21 on the basis of the link allocation information 25 updated in step SP52 or step SP55. The microprogram 20 then ends the link allocation processing.

Note that in this subsequent data transfer in the backend unit 18, multiplexed transfer is carried out in accordance with this multiplexed transfer information 26 and using the physical links 17A for which multiplexed transfer mode is set between the SAS controllers 14 and the SAS expanders 15 and between the SAS expanders 15.

(4-6) Schedule Update Processing

Figure 20:
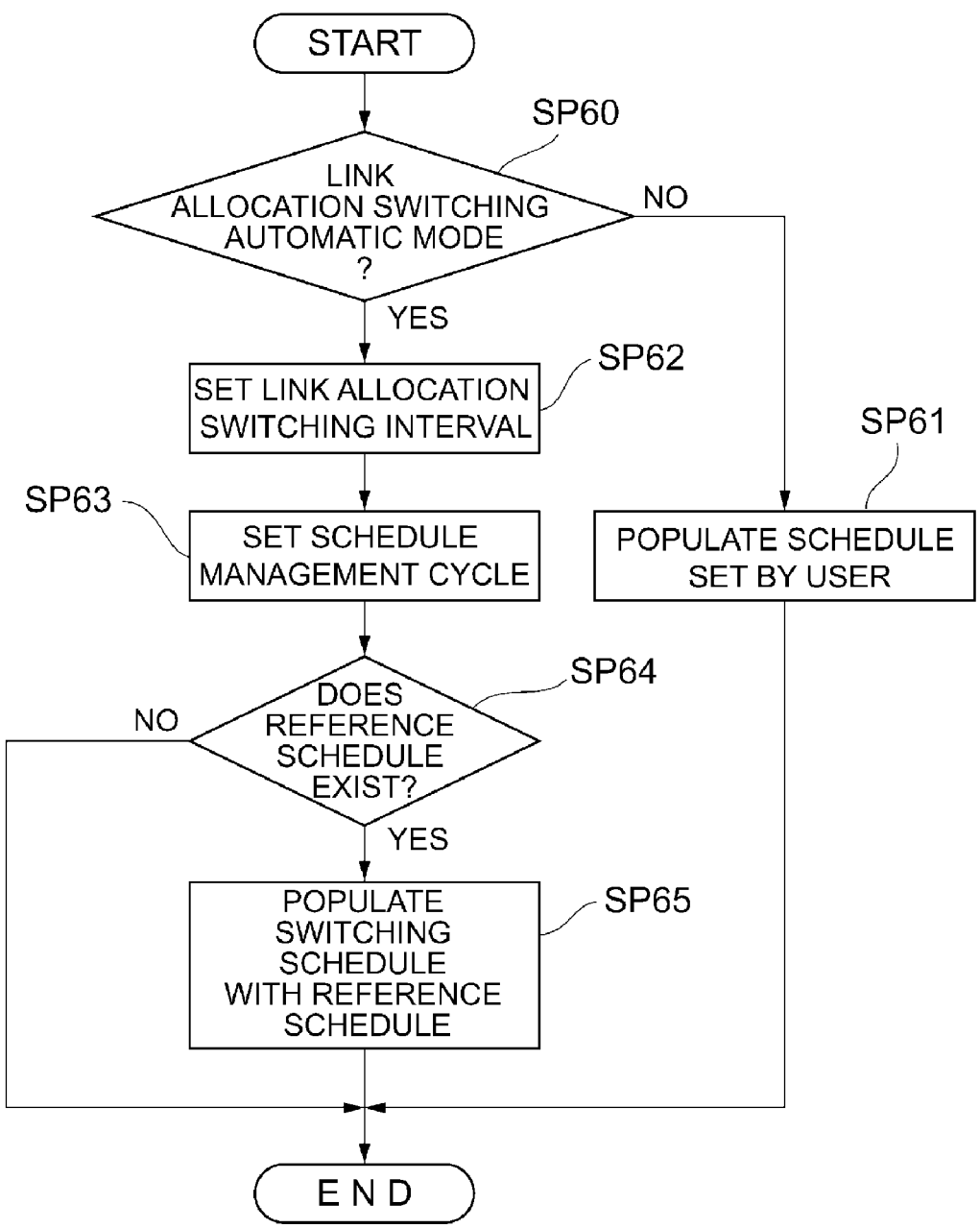
FIG. 20 Flowchart showing a processing procedure of schedule update processing.

FIG. 20 shows the specific processing content of the schedule update processing executed by the microprogram 20 for each of the aforementioned schedule management cycles.

The microprogram 20 starts schedule update processing shown in FIG. 20 for each of the schedule management cycles and first judges whether or not a link allocation switching automatic mode is set as the operating mode (SP60).

When this judgment yields a negative result, the microprogram 20 reads a preset user schedule included in the link allocation switching schedule information 28 (FIG. 14) of the backend information 21, populates the switching schedule with this user schedule (SP61), and then ends the schedule update processing.

However, when the judgment of step SP60 yields an affirmative result, the microprogram 20 sets the time interval (link allocation switching interval) with which the allocation of the physical links 17A to each link rate should be switched, to a time interval that is designated by the user beforehand (SP62).

Note that access to the backend unit 18 is suspended while the allocation of the physical links 17A to each of the link rates is being switched, and therefore the performance of the computer system 1 overall drops when the link allocation switching interval is shortened. The link allocation switching interval must therefore be adjusted so that the system performance is not affected.

The microprogram 20 then sets the schedule management cycle to a cycle that is predesignated by the user (SP63) and then judges whether or not a reference schedule exists (SP64).

The microprogram 20 ends the schedule switching processing when this judgment yields a negative result. However, when the judgment of step SP64 yields an affirmative result, the microprogram 20 populates the switching schedule with a reference schedule (SP65) and then ends the schedule update processing.

(4-7) Link Allocation Switching Processing

Figure 21:
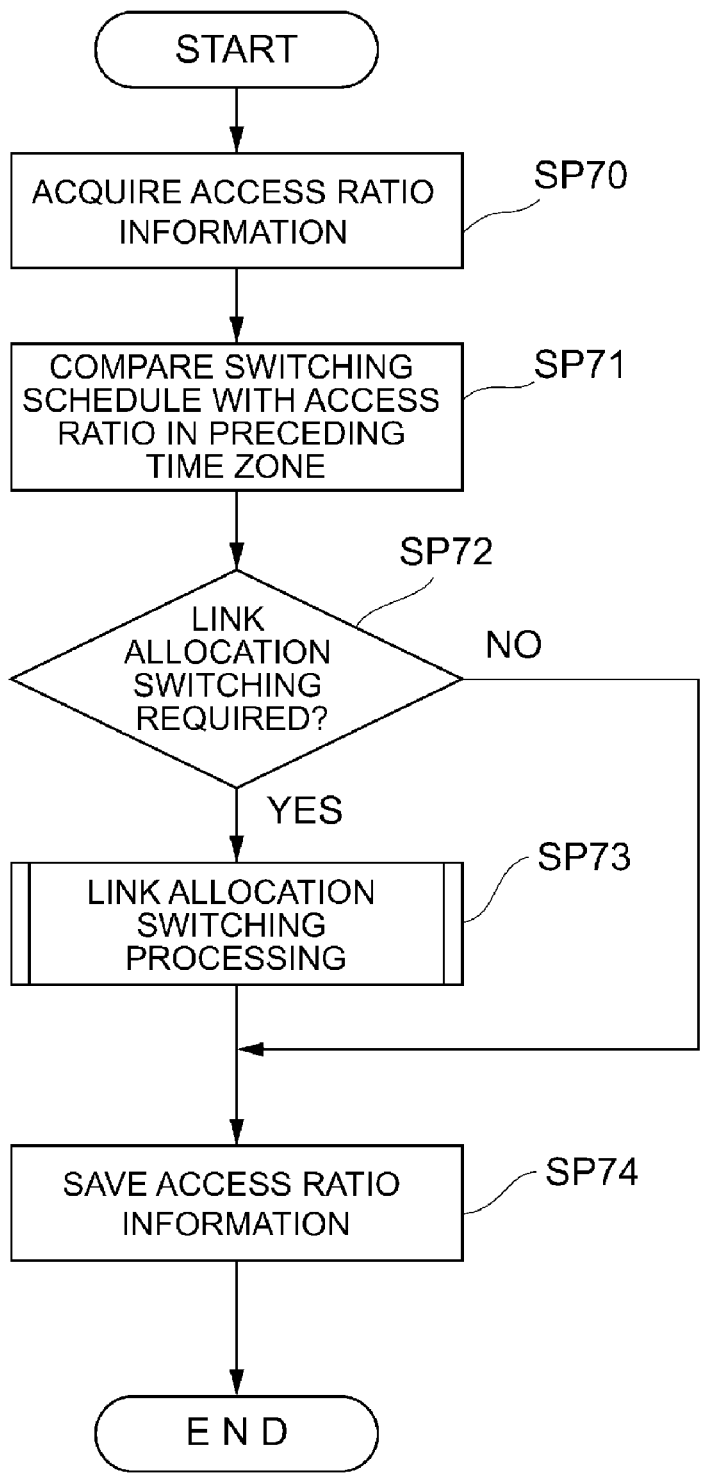
FIG. 21 Flowchart showing a processing procedure of link allocation switching processing.

FIG. 21 shows the processing procedure for link allocation switching processing that is executed by the microprogram 20 at each link allocation switching interval that is set in (FIG. 20) step SP62 of the aforementioned schedule update processing if link allocation switching mode has been set as the operating mode.

The microprogram 20 starts link allocation switching processing shown in FIG. 20 at each link allocation switching interval if the link allocation switching mode has been set as the operating mode, and first acquires the access ratios of each link rate in the preceding time zone of each wide link 17 being targeted from the monitoring performance information 27B (FIG. 13) that is updated regularly by the microprogram 20 (SP70).

Thereafter, the microprogram 20 compares, for each wide link 17 being targeted, the ratio of the physical links 17A to be allocated to each link rate prescribed in the switching schedule with the access ratio of each link rate in the preceding time zone acquired in step SP70 (SP71).

The microprogram 20 judges, for each wide link 17 being targeted and on the basis of the result of the comparison, whether or not the number of physical links allocated to each link rate must be switched (SP72).

When this judgment yields a negative result, the microprogram 20 then advances to step SP74 and, when an affirmative result is obtained, the microprogram 20 allocates, for each wide link 17 being targeted, physical links 17A in the required number to each link rate by executing the link allocation processing described earlier with reference to FIG. 19 (SP73).

Subsequently the microprogram 20 additionally registers, in the link allocation switching schedule information 28 (FIG. 14) in the backend information 21, access ratios of each link rate in each wide link 17 acquired in step SP70 as access ratio information (SP74), and then ends the link allocation switching processing.

(5) Advantageous Effects of Embodiment

In the computer system 1 of this embodiment as described hereinabove, since I/O from the host device 20 is restricted where necessary if a link fault occurs in the backend unit 18, command time-out frequently occurs and closure of the SAS controller 14 as well as the occurrence of system shutdown and so forth can be naturally and effectively prevented. The reliability of the disk array system 3 can accordingly be improved.

Moreover, in the computer system 1, if there is a mixture of hard disk drives 16 of a plurality of types with different link rates within the backend unit 18, the plurality of physical links 17A that form the wide links 17 connecting the SAS controllers 14 and the uppermost SAS expanders 15 and connecting the SAS expanders 15 can be proportionally distributed to each link rate on the basis of a total number of hard disk drives 16 for each link rate connected to the wide link 17, a proportion of the total number of accesses to the hard disk drives 16 of each link rate, and the link rate, and hence physical link allocation that conforms to the user environment can be performed.

In addition, in this computer system 1, the allocation of physical links 17A to each link rate can also be carried out in accordance with a user schedule created by the user beforehand or a reference schedule, and therefore superior physical link allocation that conforms to user demands and to the system environment can be performed.

(6) Further Embodiments

Note that in the above embodiment, a case in which the present invention is applied to the disk array system 3 configured as shown in FIG. 1 was described. However, the present invention is not limited to such a case and can be widely applied to disk array system having other configurations.

In the above embodiment, a case was described where, when notification regarding a link fault is supplied from the SAS controllers 14, the microprogram 20 restricts receipt of I/O requests sent from the host device 2 where necessary. However, the present invention is not limited such an arrangement. For example, the microprogram 20 may instead restrict the number of I/O requests sent to the disk array system 3 on the host device 2 side by notifying the host device 2 that the issuance of I/O requests is restricted. As a result, the load on the microprogram 20 following such notification to the host device 2 can be reduced.

Moreover, in the above embodiment, a case was described where the controller for controlling data I/O to and from the backend unit 18 is configured from the SAS controllers 14, where a plurality of expanders connected to the SAS controllers 14 using a tree-structure topology are configured from the SAS expanders 15, and where the respective storage devices connected to the corresponding SAS expanders 15 are configured from the SAS hard disk drive 16. However, the present invention is not limited to such a case, and components other than the SAS controllers 14, the SAS expanders 15, and the SAS hard disk drives 16 may also be applied as the controllers, expanders, and storage devices.

Moreover, in the above embodiment, a case was described where the CPU11 (and the microprogram 20), which is charged with controlling the overall operation of the disk array system 3, is applied as the control unit that executes processing relating to the I/O restriction function, link allocation function, and link allocation switching function according to this embodiment. However, the present invention is not limited to such an arrangement, and hardware and software for executing the processing of the control unit may also be provided separately from the CPU 11. The same advantageous effects as those of the above embodiment can thus be obtained.

Industrial Applicability

The present invention can also be applied to the disk array system to which the wide link technology is applied.

Reference Signs List

1 Computer system
2 Host device
3 Disk array system
4 Management client
11 CPU
12 Memory
14 SAS controller
15 Expander
16 Hard disk drive
17 Wide link
17A Physical link
Microprogram
21 Backend information
22 SAS controller information
23 Expander information
24 Link status information
Link allocation information
26 Multiplexed transfer information
27 Performance information
27A Performance threshold value information
27B Monitoring performance information
28 Link allocation switching schedule information

The invention claimed is:

1. A disk array system, comprising:
a controller for controlling data I/O to and from a backend unit;
a plurality of expanders provided in the backend unit and connected to the controller by way of a tree-structure topology:
a plurality of storage devices provided in the backend unit and each connected to the corresponding expander; and
a control unit for controlling the controller based on an I/O request from a host device,
wherein the controller notifies the control unit of a link fault that has occurred in the backend unit, and the control unit, when supplied with the link fault notification from the controller, restricts issuance of I/O requests from the host device or restricts receipt of I/O requests sent from the host device as necessary,
wherein the controller is an SAS (Serial Attached SCSI)-compliant SAS controller, the expander is an SAS expander compliant with the SAS standard, the storage device is a hard disk drive compliant with the SAS standard, the control unit is a CPU (Central Processing Unit) for controlling data I/O to and from the hard disk drive in response to an I/O request from the host device, the SAS controller and the uppermost SAS expander, and the SAS expanders are connected via a wide link obtained by bundling a plurality of physical links as a single logical link, the CPU, when supplied with the link fault notification from the SAS controller, notifies a system administrator of the occurrence of the link fault and the location of the fault as necessary, if, as the hard disk drives, hard disk drives of a plurality of types having different link rates exist, for a corresponding wide link among the wide links that connect the SAS controller and the uppermost SAS expander and connect the SAS expanders respectively, the CPU calculates the number of physical links allocated to each link rate based on a total number of the hard disk drives for each link rate which are connected to the wide link, a proportion of the total number of accesses to the hard disk drives of each link rate, and the link rate and, based on the calculation result, the CPU switches the number of physical links allocated to each of the link rates as necessary, in a case where a user schedule created by the user beforehand is set, the CPU switches the number of physical links allocated to each link rate for the corresponding wide link in accordance with the user schedule, even if the user schedule is set, when a link allocation switching automatic mode is set as the operating mode, the CPU judges whether or not, for each time zone obtained by dividing one day by a predetermined time interval, it is necessary to switch the allocation of the number of physical links to each link rate on the basis of an access ratio to the hard disk drives of each link rate in the preceding time zone and an access ratio of each link rate of the previous corresponding day in a predetermined cycle, and if it is judged necessary to switch the allocation of the number of physical links to each link rate, for a corresponding wide link among the wide links that connect the SAS controller and the uppermost SAS expander and connect the SAS expanders respectively, the CPU calculates the number of physical links allocated to each link rate based on a total number of hard disk drives for each link rate which are connected to the wide link, a proportion of the total number of accesses to the hard disk drives of each link rate, and the link rate and, based on the calculation result, the CPU switches the number of physical links allocated to each of the link rates as necessary.

2. The disk array system according to claim 1, wherein the control unit notifies the system administrator of the occurrence of the link fault and the location of the fault.

3. A disk array system, comprising:
a controller for controlling data I/O to and from a backend unit;
a plurality of expanders provided in the backend unit and connected to the controller by way of a tree-structure topology;
a plurality of storage devices provided in the backend unit and each connected to the corresponding expander; and
a control unit for controlling the controller on the basis of an I/O request from a host device,
wherein the controller notifies the control unit of a link fault that has occurred in the backend unit, and the control unit, when supplied with the link fault notification from the controller, restricts issuance of I/O requests from the host device or restricts receipt of I/O requests sent from the host device as necessary, and
wherein the controller and the uppermost expander and the expanders are each connected via a wide link obtained by bundling a plurality of physical links as a single logical link, wherein if, as the storage devices, storage devices of a plurality of types having different link rates exist and when the notification of the link fault from the controller is received, for a corresponding wide link among the wide links that connect the controller and the uppermost expander and connect the expanders respectively, the control unit calculates the number of physical links allocated to each link rate based on a total number of the storage devices for each link rate which are connected to the wide link, a proportion of the total number of accesses to the storage devices of each link rate, and the link rate and, based on the calculation result, the control unit switches the number of physical links allocated to each of the link rates as necessary.

4. The disk array system according to claim 3, wherein, if a first schedule that is preset by the user has been set, the control unit switches, with respect to the corresponding wide link, the number of physical links to be allocated to each link rate in accordance with the first schedule.

5. The disk array system according to claim 3, wherein, when a predetermined operating mode has been set, the control unit judges whether or not, for each time zone obtained by dividing one day by a predetermined time interval, it is necessary to switch the allocation of the number of physical links to each link rate based on an access ratio to the storage devices of each link rate in the preceding time zone and of a second schedule determined beforehand that is to be referred to, wherein, if it is judged necessary to switch the allocation of the number of physical links to each link rate, for a corresponding wide link among the wide links that connect the controller and the uppermost expander and connect the expanders respectively, the control unit calculates the number of physical links allocated to each link rate based on a total number of the storage devices for each link rate which are connected to the wide link, a proportion of the total number of accesses to the storage devices of each link rate, and the link rate and, based on the calculation result, switches the number of physical links allocated to each of the link rates as necessary.

6. The disk array system according to claim 5, wherein the second schedule is an access ratio for each link rate on a corresponding previous day in a predetermined cycle.

7. A traffic control method for a disk array system, the disk array system comprising:
a controller for controlling data I/O to and from a backend unit;
a plurality of expanders provided in the backend unit and connected to the controller by way of a tree-structure topology;
a plurality of storage devices provided in the backend unit and each connected to the corresponding expander; and
a control unit for controlling the controller based on an I/O request from a host device, the traffic control method comprising:
a first step in which the controller notifies the control unit of a link fault that has occurred in the backend unit: and a second step in which the control unit, when supplied with the link fault notification from the controller, restricts issuance of I/O requests from the host device or restricts receipt of I/O requests sent from the host device as necessary,
wherein the controller is an SAS (Serial Attached SCSI)-compliant SAS controller, the expander is an SAS expander compliant with the SAS standard, the storage device is a hard disk drive compliant with the SAS standard, the control unit is a CPU (Central Processing Unit) for controlling data I/O to and from the hard disk drive in response to an I/O request from the host device, the SAS controller and the uppermost SAS expander, and the SAS expanders are connected via a wide link obtained by bundling a plurality of physical links as a single logical link, wherein, in the second step, the CPU, when supplied with the link fault notification from the SAS controller, notifies a system administrator of the occurrence of the link fault and the location of the fault as necessary, and, parallel to the processing of the first and second steps, if, as the hard disk drives, hard disk drives of a plurality of types having different link rates exist, for a corresponding wide link among the wide links that connect the SAS controller and the uppermost SAS expander and connect the SAS expanders respectively, the CPU calculates the number of physical links allocated to each link rate on the basis of a total number of the hard disk drives for each link rate which are connected to the wide link, a proportion of the total number of accesses to the hard disk drives of each link rate, and the link rate and, based on the calculation result, the CPU switches the number of physical links allocated to each of the link rates as necessary, the CPU switches the number of physical links allocated to each link rate for the corresponding wide link in accordance with a user schedule preset by the user, when a link allocation switching automatic mode is set, the CPU judges whether or not, for each time zone obtained by dividing one day by a predetermined time interval, it is necessary to switch the allocation of the number of physical links to each link rate based on an access ratio to the hard disk drives of each link rate in the preceding time zone and an access ratio of each link rate of the previous corresponding day in a predetermined cycle, and if it is judged necessary to switch the allocation of the number of physical links to each link rate, for a corresponding wide link among the wide links that connect the SAS controller and the uppermost SAS expander and connect the SAS expanders respectively, the CPU calculates the number of physical links allocated to each link rate based on the a total number of hard disk drives for each link rate which are connected to the wide link, a proportion of the total number of accesses to the hard disk drives of each link rate, and the link rate and, based on the calculation result, the CPU switches the number of physical links allocated to each of the link rates as necessary.

8. The traffic control method according to claim 7, wherein, in the second step, the control unit notifies the system administrator of the occurrence of the link fault and the location of the fault.

9. A traffic control method for a disk array system, the disk array system comprising:
a controller for controlling data I/O to and from a backend unit;
a plurality of expanders provided in the backend unit and connected to the controller by way of a tree-structure topology;
a plurality of storage devices provided in the backend unit and each connected to the corresponding expander; and
a control unit for controlling the controller based on an I/O request from a host device, the traffic control method comprising:
a first step in which the controller notifies the control unit of a link fault that has occurred in the backend unit; and
a second step in which the control unit, when supplied with the link fault notification from the controller, restricts issuance of I/O requests from the host device or restricts receipt of I/O requests sent from the host device as necessary,
wherein the controller and the uppermost expander and the expanders are each connected via a wide link obtained by bundling a plurality of physical links as a single logical link, wherein, parallel to the processing of the first and second steps, if, as the storage devices, storage devices of a plurality of types having different link rates exist and when the notification of the link fault from the controller is received, for a corresponding wide link among the wide links that connect the controller and the uppermost expander and connect the expanders respectively, the control unit calculates the number of physical links allocated to each link rate based on a total number of the storage devices for each link rate which are connected to the wide link, a proportion of the total number of accesses to the storage devices of each link rate, and the link rate and, based on the calculation result, the control unit switches the number of physical links allocated to each of the link rates as necessary.

10. The traffic control method according to claim 9, wherein, parallel to the first and second steps, the control unit switches, with respect to a corresponding wide link, the number of physical links to be allocated to each link rate in accordance with a first schedule preset by the user.

11. The traffic control method according to claim 9, wherein, parallel to the first and second steps, when a predetermined operating mode has been set, the control unit judges whether or not, for each time zone obtained by dividing one day by a predetermined time interval, it is necessary to switch the allocation of the number of physical links to each link rate based on an access ratio to the storage devices of each link rate in the preceding time zone and of a second schedule determined beforehand that is to be referred to, wherein, if it is judged necessary to switch the allocation of the number of physical links to each link rate, for a corresponding wide link among the wide links that connect the controller and the uppermost expander and connect the expanders respectively, the control unit calculates the number of physical links allocated to each link rate based on a total number of the storage devices for each link rate which are connected to the wide link, a proportion of the total number of accesses to the storage devices of each link rate, and the link rate and, based on the calculation result, switches the number of physical links allocated to each of the link rates as necessary.

12. The traffic control method according to claim 11, wherein the second schedule is an access ratio for each link rate on a corresponding previous day in a predetermined cycle.

* * * * *